(12) United States Patent
Yoon et al.

(10) Patent No.: US 10,424,272 B2
(45) Date of Patent: Sep. 24, 2019

(54) ROLLABLE MOBILE TERMINAL AND CONTROL METHOD THEREOF

(71) Applicant: LG ELECTRONICS INC., Seoul (KR)

(72) Inventors: Sunghye Yoon, Seoul (KR); Sujin Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 437 days.

(21) Appl. No.: 15/151,392

(22) Filed: May 10, 2016

(65) Prior Publication Data

US 2017/0154609 A1    Jun. 1, 2017

(30) Foreign Application Priority Data

Nov. 27, 2015    (KR) .......................... 10-2015-0167996

(51) Int. Cl.
*G09G 5/373*    (2006.01)
*G06F 3/041*    (2006.01)
(Continued)

(52) U.S. Cl.
CPC ........... *G09G 5/373* (2013.01); *G06F 3/0412* (2013.01); *G06F 3/0416* (2013.01);
(Continued)

(58) Field of Classification Search
CPC ..................................................... G09G 5/373
See application file for complete search history.

(56) References Cited

U.S. PATENT DOCUMENTS

| 2010/0033435 | A1  | 2/2010 | Huitema |
| 2011/0292081 | A1* | 12/2011 | Matsunobu ........... G06F 3/1423 |
|  |  |  | 345/655 |
| 2012/0242610 | A1  | 9/2012 | Yasumatsu |
| 2013/0127918 | A1* | 5/2013 | Kang .................... G06F 3/0481 |
|  |  |  | 345/660 |

(Continued)

FOREIGN PATENT DOCUMENTS

| KR | 10-2014-0025231 | 3/2014 |
| KR | 10-2014-0112988 | 9/2014 |
| KR | 10-2015-0068823 | 6/2015 |

OTHER PUBLICATIONS

PCT International Application No. PCT/KR20161000291, Written Opinion of the International Searching Authority dated Jul. 27, 2016, 13 pages.

*Primary Examiner* — William Boddie
*Assistant Examiner* — Andrew B Schnirel
(74) *Attorney, Agent, or Firm* — Lee, Hong, Degerman, Kang & Waimey PC

(57) ABSTRACT

Disclosed are a mobile terminal having a rollable touch screen, and a method of controlling the same. The mobile terminal includes: a touch screen configured to be rollable; a first body portion connected to a first end of the touch screen and configured to accommodate the touch screen in a rolled state; a second body portion connected to a second end of the touch screen; a sensing unit configured to sense at least one region of the touch screen exposed external to the first body portion; and a controller configured to cause the touch screen to display a first icon on a display region, the display region corresponding to the sensed at least one region, wherein the first icon corresponds to a first application which supports a screen ratio of the display region, wherein the first application is one of a plurality of applications installed at the mobile terminal.

12 Claims, 15 Drawing Sheets

(51) Int. Cl.
  *G06F 3/0481*   (2013.01)
  *G06F 3/0483*   (2013.01)
  *G06F 3/0488*   (2013.01)
  *G09G 5/14*     (2006.01)
  *G09G 5/38*     (2006.01)

(52) U.S. Cl.
  CPC .......... *G06F 3/0483* (2013.01); *G06F 3/0488* (2013.01); *G06F 3/04817* (2013.01); *G09G 5/14* (2013.01); *G09G 5/38* (2013.01); *G06F 2203/04102* (2013.01); *G06F 2203/04803* (2013.01); *G09G 2340/0442* (2013.01); *G09G 2340/0464* (2013.01); *G09G 2340/14* (2013.01); *G09G 2354/00* (2013.01); *G09G 2370/16* (2013.01); *G09G 2380/02* (2013.01)

(56) References Cited

U.S. PATENT DOCUMENTS

| | | | |
|---|---|---|---|
| 2013/0201208 A1* | 8/2013 | Cho | G06F 3/1431 345/619 |
| 2014/0015743 A1* | 1/2014 | Seo | G06F 1/1694 345/156 |
| 2014/0118317 A1* | 5/2014 | Song | G06F 1/1652 345/204 |
| 2014/0218375 A1* | 8/2014 | Kim | G06F 3/147 345/501 |
| 2015/0153777 A1* | 6/2015 | Liu | G06F 1/1652 345/173 |
| 2015/0220118 A1* | 8/2015 | Kwak | G06F 3/14 345/667 |

\* cited by examiner

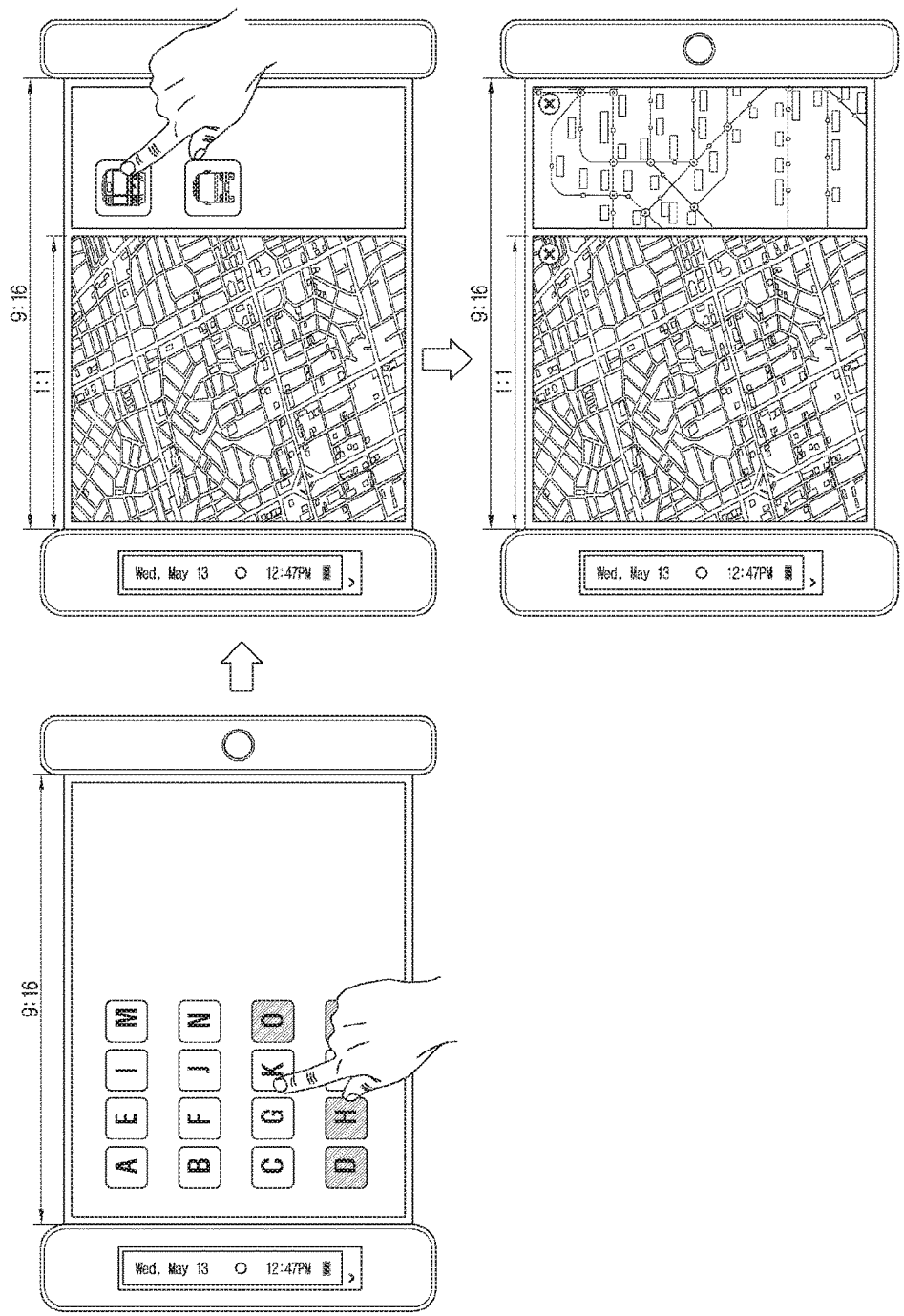

ROLLABLE MOBILE TERMINAL AND CONTROL METHOD THEREOF

CROSS-REFERENCE TO RELATED APPLICATION

Pursuant to 35 U.S.C. § 119(a), this application claims the benefit of earlier filing date and right of priority to Korean Application No. 10-2015-0167996, filed on Nov. 27, 2015, the contents of which is incorporated by reference herein in its entirety.

BACKGROUND OF THE INVENTION

1. Field of the Invention

The present invention relates to a mobile terminal, and more particularly, to a rollable mobile terminal having a rollable touch screen and a control method thereof.

2. Background of the Invention

Terminals may be generally classified as mobile/portable terminals or stationary terminals according to their mobility. Mobile terminals may also be classified as handheld terminals or vehicle mounted terminals according to whether or not a user can directly carry the terminal.

Mobile terminals have become increasingly more functional. Examples of such functions include data and voice communications, capturing images and video via a camera, recording audio, playing music files via a speaker system, and displaying images and video on a display. Some mobile terminals include additional functionality which supports game playing, while other terminals are configured as multimedia players. More recently, mobile terminals have been configured to receive broadcast and multicast signals which permit viewing of content such as videos and television programs.

The conventional mobile terminal has a fixed size since a display region is fixed. This may cause a user's inconvenience in carrying the mobile terminal having a fixed size. In order to solve such a problem, flexible display devices or rollable display devices which can be bent in a rollable manner are being researched and developed actively.

A user may control a display region to be used according to his or her preference, using characteristics of a rollable display. That is, a user may select at least one region among an entire region of the rollable display, where screen information is to be output.

A plurality of applications are installed at the mobile terminal, and execution screens thereof are output to the rollable display. The application means an application program designed to execute a specific task, and a screen ratio of the execution screen is determined by a manufacturer of the application. If the execution screen and the rollable display have the same screen ratio, even if they have different sizes (horizontal length/vertical length) from each other, the mobile terminal may display the execution screen on the display region by enlarging/contracting the execution screen. However, if the execution screen and the rollable display have different screen ratios, part of the execution screen may not be displayed on the rollable display, or the rollable display may have an empty space where the execution screen is not displayed. In order to solve such a problem, a novel type of user interface may be considered.

SUMMARY OF THE INVENTION

Therefore, an aspect of the detailed description is to provide a rollable mobile terminal capable of providing a novel user interface considering characteristics of a rollable display, and a control method thereof.

Another aspect of the detailed description is to provide a rollable mobile terminal capable of recommending, to a user, an application for outputting an execution screen to a display region of a rollable display in an optimum manner, and a control method thereof.

To achieve these and other advantages and in accordance with the purpose of this specification, as embodied and broadly described herein, there is provided a rollable mobile terminal including: a touch screen formed to be rollable; a first body part connected to one end of the touch screen, and configured to accommodate therein the touch screen in a rollable manner; a second body part connected to another end of the touch screen; a sensing unit configured to sense at least one region of the touch screen, exposed to the outside of the first body part; and a controller configured to set the sensed at least one region as a display region, and configured to control the touch screen such that an icon of an application which supports a screen ratio of the display region, among a plurality of applications installed at the rollable mobile terminal, is displayed on the display region.

The rollable mobile terminal and the control method thereof may have the following advantages.

As a display region for displaying screen information is changed, an application optimum to the display region may be recommended to a user. Since an application optimum for its execution screen to be displayed on the display region is recommended to a user, a user interface to more enhance a user's convenience may be provided.

Further scope of applicability of the present application will become more apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from the detailed description.

BRIEF DESCRIPTION OF THE DRAWINGS

The accompanying drawings, which are included to provide a further understanding of the invention and are incorporated in and constitute a part of this specification, illustrate exemplary embodiments and together with the description serve to explain the principles of the invention.

In the drawings:

FIGS. 6A and 6B are conceptual views illustrating an operation of a rollable mobile terminal when an execution screen is displayed on a display region;

DETAILED DESCRIPTION OF THE INVENTION

Figure 1A:
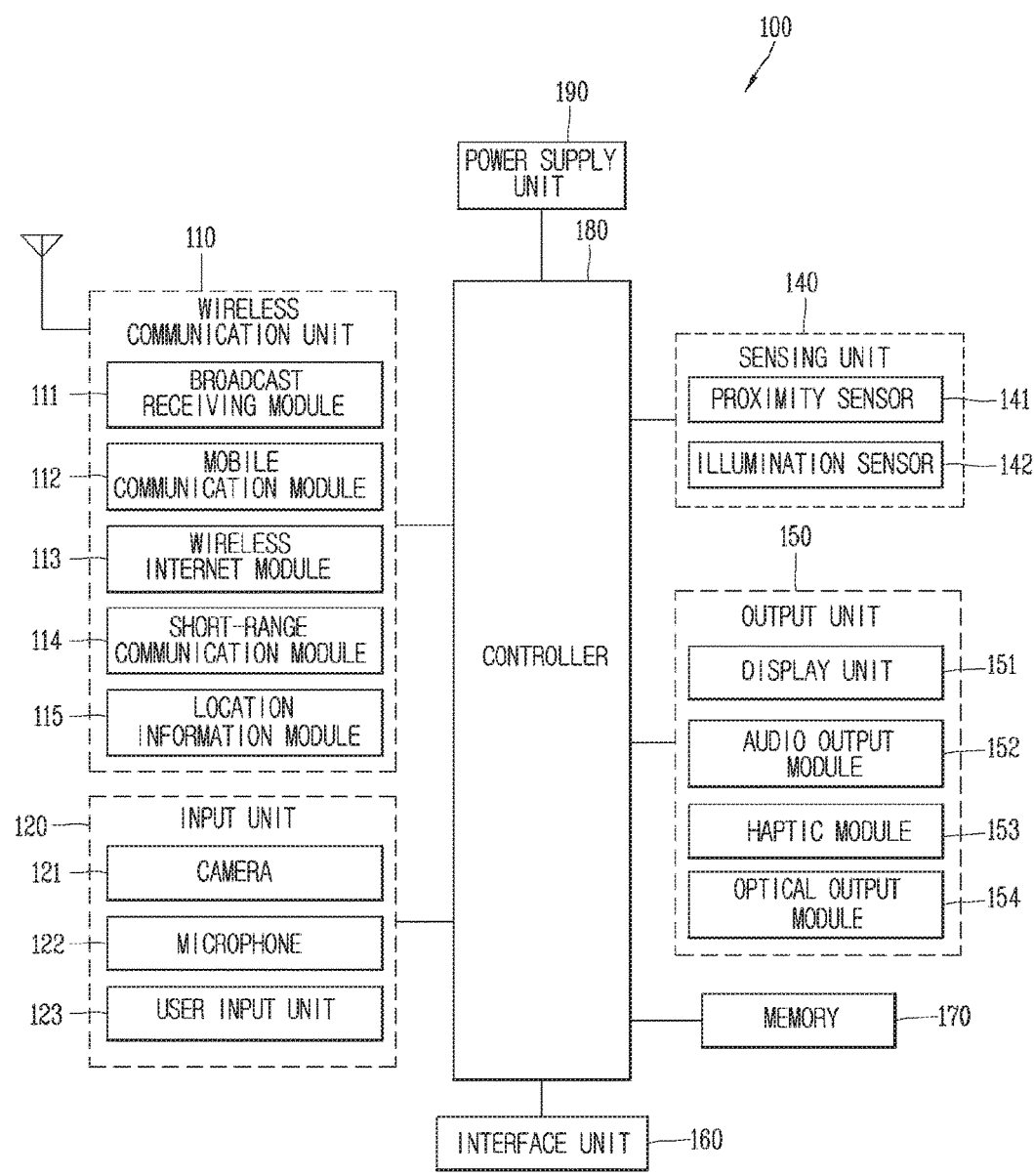
FIG. 1A is a block diagram illustrating a mobile terminal according to the present invention.

Description will now be given in detail according to exemplary embodiments disclosed herein, with reference to the accompanying drawings. For the sake of brief description with reference to the drawings, the same or equivalent components may be provided with the same or similar reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. In the present disclosure, that which is well-known to one of ordinary skill in the relevant art has generally been omitted for the sake of brevity. The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings.

It will be understood that although the terms first, second, etc. may be used herein to describe various elements, these elements should not be limited by these terms. These terms are generally only used to distinguish one element from another.

It will be understood that when an element is referred to as being "connected with" another element, the element can be connected with the other element or intervening elements may also be present. In contrast, when an element is referred to as being "directly connected with" another element, there are no intervening elements present.

A singular representation may include a plural representation unless it represents a definitely different meaning from the context. Terms such as "include" or "has" are used herein and should be understood that they are intended to indicate an existence of several components, functions or steps, disclosed in the specification, and it is also understood that greater or fewer components, functions, or steps may likewise be utilized.

Mobile terminals presented herein may be implemented using a variety of different types of terminals. Examples of such terminals include cellular phones, smart phones, user equipment, laptop computers, digital broadcast terminals, personal digital assistants (PDAs), portable multimedia players (PMPs), navigators, portable computers (PCs), slate PCs, tablet PCs, ultra books, wearable devices (for example, smart watches, smart glasses, head mounted displays (HMDs)), and the like.

By way of non-limiting example only, further description will be made with reference to particular types of mobile terminals. However, such teachings apply equally to other types of terminals, such as those types noted above. In addition, these teachings may also be applied to stationary terminals such as digital TV, desktop computers, and a digital signage. That is, the present invention may be applied to a stationary terminal having a touch screen formed to be rollable.

Figure 1B:
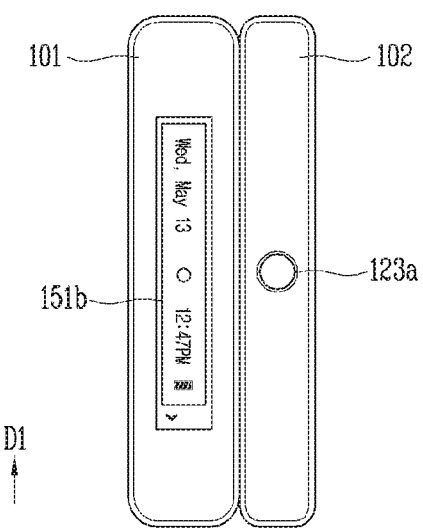
FIGS. 1B to 1D are conceptual views illustrating an example of a rollable mobile terminal according to an embodiment of the present invention.
Figure 1C:
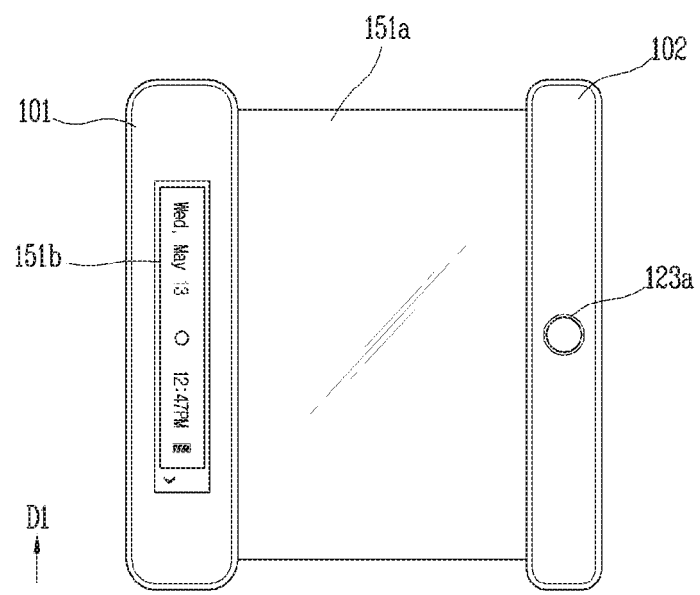

Reference is now made to FIGS. 1A-10, where FIG. 1A is a block diagram of a mobile terminal in accordance with the present disclosure, and FIGS. 1B and 1C are conceptual views of one example of the mobile terminal, viewed from different directions.

The mobile terminal 100 is shown having components such as a wireless communication unit 110, an input unit 120, a sensing unit 140, an output unit 150, an interface unit 160, a memory 170, a controller 180, and a power supply unit 190. It is understood that implementing all of the illustrated components is not a requirement, and that greater or fewer components may alternatively be implemented.

Referring now to FIG. 1A, the mobile terminal 100 is shown having wireless communication unit 110 configured with several commonly implemented components. For instance, the wireless communication unit 110 typically includes one or more components which permit wireless communication between the mobile terminal 100 and a wireless communication system or network within which the mobile terminal is located.

The wireless communication unit 110 typically includes one or more modules which permit communications such as wireless communications between the mobile terminal 100 and a wireless communication system, communications between the mobile terminal 100 and another mobile terminal, communications between the mobile terminal 100 and an external server. Further, the wireless communication unit 110 typically includes one or more modules which connect the mobile terminal 100 to one or more networks. To facilitate such communications, the wireless communication unit 110 includes one or more of a broadcast receiving module 111, a mobile communication module 112, a wireless Internet module 113, a short-range communication module 114, and a location information module 115.

The input unit 120 includes a camera 121 for obtaining images or video, a microphone 122, which is one type of audio input device for inputting an audio signal, and a user input unit 123 (for example, a touch key, a push key, a mechanical key, a soft key, and the like) for allowing a user to input information. Data (for example, audio, video, image, and the like) is obtained by the input unit 120 and may be analyzed and processed by controller 180 according to device parameters, user commands, and combinations thereof.

The sensing unit 140 is typically implemented using one or more sensors configured to sense internal information of the mobile terminal, the surrounding environment of the mobile terminal, user information, and the like. For example, in FIG. 1A, the sensing unit 140 is shown having a proximity sensor 141 and an illumination sensor 142.

If desired, the sensing unit 140 may alternatively or additionally include other types of sensors or devices, such as a touch sensor, an acceleration sensor, a magnetic sensor, a G-sensor, a gyroscope sensor, a motion sensor, an RGB sensor, an infrared (IR) sensor, a finger scan sensor, a ultrasonic sensor, an optical sensor (for example, camera 121), a microphone 122, a battery gauge, an environment sensor (for example, a barometer, a hygrometer, a thermometer, a radiation detection sensor, a thermal sensor, and a gas sensor, among others), and a chemical sensor (for example, an electronic nose, a health care sensor, a biometric sensor, and the like), to name a few. The mobile terminal 100 may be configured to utilize information obtained from sensing unit 140, and in particular, information obtained from one or more sensors of the sensing unit 140, and combinations thereof.

The output unit 150 is typically configured to output various types of information, such as audio, video, tactile output, and the like. The output unit 150 is shown having a display unit 151, an audio output module 152, a haptic module 153, and an optical output module 154.

The display unit 151 may have an inter-layered structure or an integrated structure with a touch sensor in order to facilitate a touch screen. The touch screen may provide an output interface between the mobile terminal 100 and a user, as well as function as the user input unit 123 which provides an input interface between the mobile terminal 100 and the user.

The interface unit 160 serves as an interface with various types of external devices that can be coupled to the mobile terminal 100. The interface unit 160, for example, may include any of wired or wireless ports, external power supply ports, wired or wireless data ports, memory card ports, ports for connecting a device having an identification module, audio input/output (I/O) ports, video I/O ports, earphone ports, and the like. In some cases, the mobile terminal 100 may perform assorted control functions associated with a connected external device, in response to the external device being connected to the interface unit 160.

The memory 170 is typically implemented to store data to support various functions or features of the mobile terminal 100. For instance, the memory 170 may be configured to store application programs executed in the mobile terminal 100, data or instructions for operations of the mobile terminal 100, and the like. Some of these application programs may be downloaded from an external server via wireless communication. Other application programs may be installed within the mobile terminal 100 at time of manufacturing or shipping, which is typically the case for basic functions of the mobile terminal 100 (for example, receiving a call, placing a call, receiving a message, sending a message, and the like). It is common for application programs to be stored in the memory 170, installed in the mobile terminal 100, and executed by the controller 180 to perform an operation (or function) for the mobile terminal 100.

The controller 180 typically functions to control overall operation of the mobile terminal 100, in addition to the operations associated with the application programs. The controller 180 may provide or process information or functions appropriate for a user by processing signals, data, information and the like, which are input or output by the various components depicted in FIG. 1A, or activating application programs stored in the memory 170. As one example, the controller 180 controls some or all of the components illustrated in FIGS. 1A-1C according to the execution of an application program that have been stored in the memory 170.

The power supply unit 190 can be configured to receive external power or provide internal power in order to supply appropriate power required for operating elements and components included in the mobile terminal 100. The power supply unit 190 may include a battery, and the battery may be configured to be embedded in the terminal body, or configured to be detachable from the terminal body.

At least some of the above components may operate in a cooperating manner, so as to implement an operation or a control method of a glass type terminal according to various embodiments to be explained later. The operation or the control method of the mobile terminal may be implemented on the mobile terminal by driving at least one application program stored in the memory 170.

Referring still to FIG. 1A, various components depicted in this figure will now be described in more detail. Regarding the wireless communication unit 110, the broadcast receiving module 111 is typically configured to receive a broadcast signal and/or broadcast associated information from an external broadcast managing entity via a broadcast channel. The broadcast channel may include a satellite channel, a terrestrial channel, or both. In some embodiments, two or more broadcast receiving modules 111 may be utilized to facilitate simultaneously receiving of two or more broadcast channels, or to support switching among broadcast channels.

The mobile communication module 112 can transmit and/or receive wireless signals to and from one or more network entities. Typical examples of a network entity include a base station, an external mobile terminal, a server, and the like. Such network entities form part of a mobile communication network, which is constructed according to technical standards or communication methods for mobile communications (for example, Global System for Mobile Communication (GSM), Code Division Multi Access (CDMA), CDMA2000 (Code Division Multi Access 2000), EV-DO (Enhanced Voice-Data Optimized or Enhanced Voice-Data Only), Wideband CDMA (WCDMA), High Speed Downlink Packet access (HSDPA), HSUPA (High Speed Uplink Packet Access), Long Term Evolution (LTE), LTE-A (Long Term Evolution-Advanced), and the like). Examples of wireless signals transmitted and/or received via the mobile communication module 112 include audio call signals, video (telephony) call signals, or various formats of data to support communication of text and multimedia messages.

The wireless Internet module 113 is configured to facilitate wireless Internet access. This module may be internally or externally coupled to the mobile terminal 100. The wireless Internet module 113 may transmit and/or receive wireless signals via communication networks according to wireless Internet technologies.

Examples of such wireless Internet access include Wireless LAN (WLAN), Wireless Fidelity (Wi-Fi), Wi-Fi Direct, Digital Living Network Alliance (DLNA), Wireless Broadband (WiBro), Worldwide Interoperability for Microwave Access (WiMAX), High Speed Downlink Packet Access (HSDPA), HSUPA (High Speed Uplink Packet Access), Long Term Evolution (LTE), LTE-A (Long Term Evolution-Advanced), and the like. The wireless Internet module 113 may transmit/receive data according to one or more of such wireless Internet technologies, and other Internet technologies as well.

In some embodiments, when the wireless Internet access is implemented according to, for example, WiBro, HSDPA, HSUPA, GSM, CDMA, WCDMA, LTE, LTE-A and the like, as part of a mobile communication network, the wireless Internet module 113 performs such wireless Internet access. As such, the Internet module 113 may cooperate with, or function as, the mobile communication module 112.

The short-range communication module 114 is configured to facilitate short-range communications. Suitable technologies for implementing such short-range communications include BLUETOOTH™, Radio Frequency IDentification (RFID), Infrared Data Association (IrDA), Ultra-WideBand (UWB), ZigBee, Near Field Communication (NFC), Wireless-Fidelity (Wi-Fi), Wi-Fi Direct, Wireless USB (Wireless Universal Serial Bus), and the like. The short-range communication module 114 in general supports wireless communications between the mobile terminal 100 and a wireless communication system, communications between the mobile terminal 100 and another mobile terminal 100, or communications between the mobile terminal and a network where another mobile terminal 100 (or an external server) is located, via wireless area networks. One example of the wireless area networks is a wireless personal area networks.

In some embodiments, another mobile terminal (which may be configured similarly to mobile terminal 100) may be a wearable device, for example, a smart watch, a smart glass or a head mounted display (HMD), which is able to exchange data with the mobile terminal 100 (or otherwise cooperate with the mobile terminal 100). The short-range communication module 114 may sense or recognize the wearable device, and permit communication between the wearable device and the mobile terminal 100. In addition, when the sensed wearable device is a device which is authenticated to communicate with the mobile terminal 100, the controller 180, for example, may cause transmission of data processed in the mobile terminal 100 to the wearable device via the short-range communication module 114. Hence, a user of the wearable device may use the data processed in the mobile terminal 100 on the wearable device. For example, when a call is received in the mobile terminal 100, the user may answer the call using the wearable device. Also, when a message is received in the mobile terminal 100, the user can check the received message using the wearable device.

The location information module 115 is generally configured to detect, calculate, derive or otherwise identify a position of the mobile terminal. As an example, the location information module 115 includes a Global Position System (GPS) module, a Wi-Fi module, or both. If desired, the location information module 115 may alternatively or additionally function with any of the other modules of the wireless communication unit 110 to obtain data related to the position of the mobile terminal.

As one example, when the mobile terminal uses a GPS module, a position of the mobile terminal may be acquired using a signal sent from a GPS satellite. As another example, when the mobile terminal uses the Wi-Fi module, a position of the mobile terminal can be acquired based on information related to a wireless access point (AP) which transmits or receives a wireless signal to or from the Wi-Fi module.

The input unit 120 may be configured to permit various types of input to the mobile terminal 120. Examples of such input include audio, image, video, data, and user input. Image and video input is often obtained using one or more cameras 121. Such cameras 121 may process image frames of still pictures or video obtained by image sensors in a video or image capture mode. The processed image frames can be displayed on the display unit 151 or stored in memory 170. In some cases, the cameras 121 may be arranged in a matrix configuration to permit a plurality of images having various angles or focal points to be input to the mobile terminal 100. As another example, the cameras 121 may be located in a stereoscopic arrangement to acquire left and right images for implementing a stereoscopic image.

The microphone 122 is generally implemented to permit audio input to the mobile terminal 100. The audio input can be processed in various manners according to a function being executed in the mobile terminal 100. If desired, the microphone 122 may include assorted noise removing algorithms to remove unwanted noise generated in the course of receiving the external audio.

The user input unit 123 is a component that permits input by a user. Such user input may enable the controller 180 to control operation of the mobile terminal 100. The user input unit 123 may include one or more of a mechanical input element (for example, a key, a button located on a front and/or rear surface or a side surface of the mobile terminal 100, a dome switch, a jog wheel, a jog switch, and the like), or a touch-sensitive input, among others. As one example, the touch-sensitive input may be a virtual key or a soft key, which is displayed on a touch screen through software processing, or a touch key which is located on the mobile terminal at a location that is other than the touch screen. On the other hand, the virtual key or the visual key may be displayed on the touch screen in various shapes, for example, graphic, text, icon, video, or a combination thereof.

The sensing unit 140 is generally configured to sense one or more of internal information of the mobile terminal, surrounding environment information of the mobile terminal, user information, or the like. The controller 180 generally cooperates with the sending unit 140 to control operation of the mobile terminal 100 or execute data processing, a function or an operation associated with an application program installed in the mobile terminal based on the sensing provided by the sensing unit 140. The sensing unit 140 may be implemented using any of a variety of sensors, some of which will now be described in more detail.

The proximity sensor 141 may include a sensor to sense presence or absence of an object approaching a surface, or an object located near a surface, by using an electromagnetic field, infrared rays, or the like without a mechanical contact. The proximity sensor 141 may be arranged at an inner region of the mobile terminal covered by the touch screen, or near the touch screen.

The proximity sensor 141, for example, may include any of a transmissive type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared rays proximity sensor, and the like. When the touch screen is implemented as a capacitance type, the proximity sensor 141 can sense proximity of a pointer relative to the touch screen by changes of an electromagnetic field, which is responsive to an approach of an object with conductivity. In this case, the touch screen (touch sensor) may also be categorized as a proximity sensor.

The term "proximity touch" will often be referred to herein to denote the scenario in which a pointer is positioned to be proximate to the touch screen without contacting the touch screen. The term "contact touch" will often be referred to herein to denote the scenario in which a pointer makes physical contact with the touch screen. For the position corresponding to the proximity touch of the pointer relative to the touch screen, such position will correspond to a position where the pointer is perpendicular to the touch screen. The proximity sensor 141 may sense proximity touch, and proximity touch patterns (for example, distance, direction, speed, time, position, moving status, and the like).

In general, controller 180 processes data corresponding to proximity touches and proximity touch patterns sensed by the proximity sensor 141, and cause output of visual information on the touch screen. In addition, the controller 180 can control the mobile terminal 100 to execute different operations or process different data according to whether a touch with respect to a point on the touch screen is either a proximity touch or a contact touch.

A touch sensor can sense a touch applied to the touch screen, such as display unit 151, using any of a variety of touch methods. Examples of such touch methods include a resistive type, a capacitive type, an infrared type, and a magnetic field type, among others.

As one example, the touch sensor may be configured to convert changes of pressure applied to a specific part of the display unit 151, or convert capacitance occurring at a specific part of the display unit 151, into electric input signals. The touch sensor may also be configured to sense not only a touched position and a touched area, but also touch pressure and/or touch capacitance. A touch object is generally used to apply a touch input to the touch sensor. Examples of typical touch objects include a finger, a touch pen, a stylus pen, a pointer, or the like.

When a touch input is sensed by a touch sensor, corresponding signals may be transmitted to a touch controller. The touch controller may process the received signals, and then transmit corresponding data to the controller 180. Accordingly, the controller 180 may sense which region of the display unit 151 has been touched. Here, the touch controller may be a component separate from the controller 180, the controller 180, and combinations thereof.

In some embodiments, the controller 180 may execute the same or different controls according to a type of touch object that touches the touch screen or a touch key provided in addition to the touch screen. Whether to execute the same or different control according to the object which provides a touch input may be decided based on a current operating state of the mobile terminal 100 or a currently executed application program, for example.

The touch sensor and the proximity sensor may be implemented individually, or in combination, to sense various types of touches. Such touches includes a short (or tap) touch, a long touch, a multi-touch, a drag touch, a flick touch, a pinch-in touch, a pinch-out touch, a swipe touch, a hovering touch, and the like.

If desired, an ultrasonic sensor may be implemented to recognize position information relating to a touch object using ultrasonic waves. The controller 180, for example, may calculate a position of a wave generation source based on information sensed by an illumination sensor and a plurality of ultrasonic sensors. Since light is much faster than ultrasonic waves, the time for which the light reaches the optical sensor is much shorter than the time for which the ultrasonic wave reaches the ultrasonic sensor. The position of the wave generation source may be calculated using this fact. For instance, the position of the wave generation source may be calculated using the time difference from the time that the ultrasonic wave reaches the sensor based on the light as a reference signal.

The camera 121 typically includes at least one a camera sensor (CCD, CMOS etc.), a photo sensor (or image sensors), and a laser sensor.

Implementing the camera 121 with a laser sensor may allow detection of a touch of a physical object with respect to a 3D stereoscopic image. The photo sensor may be laminated on, or overlapped with, the display device. The photo sensor may be configured to scan movement of the physical object in proximity to the touch screen. In more detail, the photo sensor may include photo diodes and transistors at rows and columns to scan content received at the photo sensor using an electrical signal which changes according to the quantity of applied light. Namely, the photo sensor may calculate the coordinates of the physical object according to variation of light to thus obtain position information of the physical object.

The display unit 151 is generally configured to output information processed in the mobile terminal 100. For example, the display unit 151 may display execution screen information of an application program executing at the mobile terminal 100 or user interface (UI) and graphic user interface (GUI) information in response to the execution screen information.

In some embodiments, the display unit 151 may be implemented as a stereoscopic display unit for displaying stereoscopic images. A typical stereoscopic display unit may employ a stereoscopic display scheme such as a stereoscopic scheme (a glass scheme), an auto-stereoscopic scheme (glassless scheme), a projection scheme (holographic scheme), or the like.

The audio output module 152 is generally configured to output audio data. Such audio data may be obtained from any of a number of different sources, such that the audio data may be received from the wireless communication unit 110 or may have been stored in the memory 170. The audio data may be output during modes such as a signal reception mode, a call mode, a record mode, a voice recognition mode, a broadcast reception mode, and the like. The audio output module 152 can provide audible output related to a particular function (e.g., a call signal reception sound, a message reception sound, etc.) performed by the mobile terminal 100. The audio output module 152 may also be implemented as a receiver, a speaker, a buzzer, or the like.

A haptic module 153 can be configured to generate various tactile effects that a user feels, perceive, or otherwise experience. A typical example of a tactile effect generated by the haptic module 153 is vibration. The strength, pattern and the like of the vibration generated by the haptic module 153 can be controlled by user selection or setting by the controller. For example, the haptic module 153 may output different vibrations in a combining manner or a sequential manner.

Besides vibration, the haptic module 153 can generate various other tactile effects, including an effect by stimulation such as a pin arrangement vertically moving to contact skin, a spray force or suction force of air through a jet orifice or a suction opening, a touch to the skin, a contact of an electrode, electrostatic force, an effect by reproducing the sense of cold and warmth using an element that can absorb or generate heat, and the like.

The haptic module 153 can also be implemented to allow the user to feel a tactile effect through a muscle sensation such as the user's fingers or arm, as well as transferring the tactile effect through direct contact. Two or more haptic modules 153 may be provided according to the particular configuration of the mobile terminal 100.

An optical output module 154 can output a signal for indicating an event generation using light of a light source. Examples of events generated in the mobile terminal 100 may include message reception, call signal reception, a missed call, an alarm, a schedule notice, an email reception, information reception through an application, and the like.

A signal output by the optical output module 154 may be implemented in such a manner that the mobile terminal emits monochromatic light or light with a plurality of colors. The signal output may be terminated as the mobile terminal senses that a user has checked the generated event, for example.

The interface unit 160 serves as an interface for external devices to be connected with the mobile terminal 100. For example, the interface unit 160 can receive data transmitted from an external device, receive power to transfer to elements and components within the mobile terminal 100, or transmit internal data of the mobile terminal 100 to such external device. The interface unit 160 may include wired or wireless headset ports, external power supply ports, wired or wireless data ports, memory card ports, ports for connecting a device having an identification module, audio input/output (I/O) ports, video I/O ports, earphone ports, or the like.

The identification module may be a chip that stores various information for authenticating authority of using the mobile terminal 100 and may include a user identity module (UIM), a subscriber identity module (SIM), a universal subscriber identity module (USIM), and the like. In addition, the device having the identification module (also referred to herein as an "identifying device") may take the form of a smart card. Accordingly, the identifying device can be connected with the terminal 100 via the interface unit 160.

When the mobile terminal 100 is connected with an external cradle, the interface unit 160 can serve as a passage to allow power from the cradle to be supplied to the mobile terminal 100 or may serve as a passage to allow various command signals input by the user from the cradle to be transferred to the mobile terminal there through. Various command signals or power input from the cradle may operate as signals for recognizing that the mobile terminal is properly mounted on the cradle.

The memory 170 can store programs to support operations of the controller 180 and store input/output data (for example, phonebook, messages, still images, videos, etc.). The memory 170 may store data related to various patterns of vibrations and audio which are output in response to touch inputs on the touch screen.

The memory 170 may include one or more types of storage mediums including a Flash memory, a hard disk, a solid state disk, a silicon disk, a multimedia card micro type, a card-type memory (e.g., SD or DX memory, etc), a Random Access Memory (RAM), a Static Random Access Memory (SRAM), a Read-Only Memory (ROM), an Electrically Erasable Programmable Read-Only Memory (EEPROM), a Programmable Read-Only memory (PROM), a magnetic memory, a magnetic disk, an optical disk, and the like. The mobile terminal 100 may also be operated in relation to a network storage device that performs the storage function of the memory 170 over a network, such as the Internet.

The controller 180 may typically control the general operations of the mobile terminal 100. For example, the controller 180 may set or release a lock state for restricting a user from inputting a control command with respect to applications when a status of the mobile terminal meets a preset condition.

The controller 180 can also perform the controlling and processing associated with voice calls, data communications, video calls, and the like, or perform pattern recognition processing to recognize a handwriting input or a picture drawing input performed on the touch screen as characters or images, respectively. In addition, the controller 180 can control one or a combination of those components in order to implement various exemplary embodiments disclosed herein.

The power supply unit 190 receives external power or provide internal power and supply the appropriate power required for operating respective elements and components included in the mobile terminal 100. The power supply unit 190 may include a battery, which is typically rechargeable or be detachably coupled to the terminal body for charging.

The power supply unit 190 may include a connection port. The connection port may be configured as one example of the interface unit 160 to which an external charger for supplying power to recharge the battery is electrically connected.

As another example, the power supply unit 190 may be configured to recharge the battery in a wireless manner without use of the connection port. In this example, the power supply unit 190 can receive power, transferred from an external wireless power transmitter, using at least one of an inductive coupling method which is based on magnetic induction or a magnetic resonance coupling method which is based on electromagnetic resonance.

Various embodiments described herein may be implemented in a computer-readable medium, a machine-readable medium, or similar medium using, for example, software, hardware, or any combination thereof.

Referring now to FIGS. 1B and 10, the mobile terminal 100 is described with reference to a bar-type terminal body. However, the mobile terminal 100 may alternatively be implemented in any of a variety of different configurations. Examples of such configurations include watch-type, clip-type, glasses-type, or as a folder-type, flip-type, slide-type, swing-type, and swivel-type in which two and more bodies are combined with each other in a relatively movable manner, and combinations thereof. Discussion herein will often relate to a particular type of mobile terminal (for example, bar-type, watch-type, glasses-type, and the like). However, such teachings with regard to a particular type of mobile terminal will generally apply to other types of mobile terminals as well.

The mobile terminal 100 will generally include a case (for example, frame, housing, cover, and the like) forming the appearance of the terminal. In this embodiment, the case is formed using a front case 101 and a rear case 102. Various electronic components are incorporated into a space formed between the front case 101 and the rear case 102. At least one middle case may be additionally positioned between the front case 101 and the rear case 102.

The display unit 151 is shown located on the front side of the terminal body to output information. As illustrated, a window 151*a* of the display unit 151 may be mounted to the front case 101 to form the front surface of the terminal body together with the front case 101.

In some embodiments, electronic components may also be mounted to the rear case 102. Examples of such electronic components include a detachable battery 191, an identification module, a memory card, and the like. Rear cover 103 is shown covering the electronic components, and this cover may be detachably coupled to the rear case 102. Therefore, when the rear cover 103 is detached from the rear case 102, the electronic components mounted to the rear case 102 are externally exposed.

As illustrated, when the rear cover 103 is coupled to the rear case 102, a side surface of the rear case 102 is partially exposed. In some cases, upon the coupling, the rear case 102 may also be completely shielded by the rear cover 103. In some embodiments, the rear cover 103 may include an opening for externally exposing a camera 121*b* or an audio output module 152*b*.

The cases 101, 102, 103 may be formed by injection-molding synthetic resin or may be formed of a metal, for example, stainless steel (STS), aluminum (Al), titanium (Ti), or the like.

As an alternative to the example in which the plurality of cases form an inner space for accommodating components, the mobile terminal 100 may be configured such that one case forms the inner space. In this example, a mobile terminal 100 having a uni-body is formed in such a manner that synthetic resin or metal extends from a side surface to a rear surface.

If desired, the mobile terminal 100 may include a waterproofing unit (not shown) for preventing introduction of water into the terminal body. For example, the waterproofing unit may include a waterproofing member which is located between the window 151*a* and the front case 101, between the front case 101 and the rear case 102, or between the rear case 102 and the rear cover 103, to hermetically seal an inner space when those cases are coupled.

FIGS. 1B and 1C depict certain components as arranged on the mobile terminal. However, it is to be understood that alternative arrangements are possible and within the teachings of the instant disclosure. Some components may be omitted or rearranged. For example, the first manipulation unit 123a may be located on another surface of the terminal body, and the second audio output module 152b may be located on the side surface of the terminal body.

The display unit 151 outputs information processed in the mobile terminal 100. The display unit 151 may be implemented using one or more suitable display devices. Examples of such suitable display devices include a liquid crystal display (LCD), a thin film transistor-liquid crystal display (TFT-LCD), an organic light emitting diode (OLED), a flexible display, a 3-dimensional (3D) display, an e-ink display, and combinations thereof.

The display unit 151 may be implemented using two display devices, which can implement the same or different display technology. For instance, a plurality of the display units 151 may be arranged on one side, either spaced apart from each other, or these devices may be integrated, or these devices may be arranged on different surfaces.

The display unit 151 may also include a touch sensor which senses a touch input received at the display unit. When a touch is input to the display unit 151, the touch sensor may be configured to sense this touch and the controller 180, for example, may generate a control command or other signal corresponding to the touch. The content which is input in the touching manner may be a text or numerical value, or a menu item which can be indicated or designated in various modes.

The touch sensor may be configured in a form of a film having a touch pattern, disposed between the window 151a and a display on a rear surface of the window 151a, or a metal wire which is patterned directly on the rear surface of the window 151a. Alternatively, the touch sensor may be integrally formed with the display. For example, the touch sensor may be disposed on a substrate of the display or within the display.

The display unit 151 may also form a touch screen together with the touch sensor. Here, the touch screen may serve as the user input unit 123 (see FIG. 1A). Therefore, the touch screen may replace at least some of the functions of the first manipulation unit 123a.

The first audio output module 152a may be implemented in the form of a speaker to output voice audio, alarm sounds, multimedia audio reproduction, and the like.

The window 151a of the display unit 151 will typically include an aperture to permit audio generated by the first audio output module 152a to pass. One alternative is to allow audio to be released along an assembly gap between the structural bodies (for example, a gap between the window 151a and the front case 101). In this case, a hole independently formed to output audio sounds may not be seen or is otherwise hidden in terms of appearance, thereby further simplifying the appearance and manufacturing of the mobile terminal 100.

The optical output module 154 can be configured to output light for indicating an event generation. Examples of such events include a message reception, a call signal reception, a missed call, an alarm, a schedule notice, an email reception, information reception through an application, and the like. When a user has checked a generated event, the controller can control the optical output unit 154 to stop the light output.

The first camera 121a can process image frames such as still or moving images obtained by the image sensor in a capture mode or a video call mode. The processed image frames can then be displayed on the display unit 151 or stored in the memory 170.

The first and second manipulation units 123a and 123b are examples of the user input unit 123, which may be manipulated by a user to provide input to the mobile terminal 100. The first and second manipulation units 123a and 123b may also be commonly referred to as a manipulating portion, and may employ any tactile method that allows the user to perform manipulation such as touch, push, scroll, or the like. The first and second manipulation units 123a and 123b may also employ any non-tactile method that allows the user to perform manipulation such as proximity touch, hovering, or the like.

FIG. 1B illustrates the first manipulation unit 123a as a touch key, but possible alternatives include a mechanical key, a push key, a touch key, and combinations thereof.

Input received at the first and second manipulation units 123a and 123b may be used in various ways. For example, the first manipulation unit 123a may be used by the user to provide an input to a menu, home key, cancel, search, or the like, and the second manipulation unit 123b may be used by the user to provide an input to control a volume level being output from the first or second audio output modules 152a or 152b, to switch to a touch recognition mode of the display unit 151, or the like.

As another example of the user input unit 123, a rear input unit (not shown) may be located on the rear surface of the terminal body. The rear input unit can be manipulated by a user to provide input to the mobile terminal 100. The input may be used in a variety of different ways. For example, the rear input unit may be used by the user to provide an input for power on/off, start, end, scroll, control volume level being output from the first or second audio output modules 152a or 152b, switch to a touch recognition mode of the display unit 151, and the like. The rear input unit may be configured to permit touch input, a push input, or combinations thereof.

The rear input unit may be located to overlap the display unit 151 of the front side in a thickness direction of the terminal body. As one example, the rear input unit may be located on an upper end portion of the rear side of the terminal body such that a user can easily manipulate it using a forefinger when the user grabs the terminal body with one hand. Alternatively, the rear input unit can be positioned at most any location of the rear side of the terminal body.

Embodiments that include the rear input unit may implement some or all of the functionality of the first manipulation unit 123a in the rear input unit. As such, in situations where the first manipulation unit 123a is omitted from the front side, the display unit 151 can have a larger screen.

As a further alternative, the mobile terminal 100 may include a finger scan sensor which scans a user's fingerprint. The controller 180 can then use fingerprint information sensed by the finger scan sensor as part of an authentication procedure. The finger scan sensor may also be installed in the display unit 151 or implemented in the user input unit 123.

The microphone 122 is shown located at an end of the mobile terminal 100, but other locations are possible. If desired, multiple microphones may be implemented, with such an arrangement permitting the receiving of stereo sounds.

The interface unit 160 may serve as a path allowing the mobile terminal 100 to interface with external devices. For example, the interface unit 160 may include one or more of a connection terminal for connecting to another device (for example, an earphone, an external speaker, or the like), a port for near field communication (for example, an Infrared Data Association (IrDA) port, a Bluetooth port, a wireless LAN port, and the like), or a power supply terminal for supplying power to the mobile terminal 100. The interface unit 160 may be implemented in the form of a socket for accommodating an external card, such as Subscriber Identification Module (SIM), User Identity Module (UIM), or a memory card for information storage.

The second camera 121b is shown located at the rear side of the terminal body and includes an image capturing direction that is substantially opposite to the image capturing direction of the first camera unit 121a. If desired, second camera 121a may alternatively be located at other locations, or made to be moveable, in order to have a different image capturing direction from that which is shown.

The second camera 121b can include a plurality of lenses arranged along at least one line. The plurality of lenses may also be arranged in a matrix configuration. The cameras may be referred to as an "array camera." When the second camera 121b is implemented as an array camera, images may be captured in various manners using the plurality of lenses and images with better qualities.

As shown in FIG. 10, a flash 124 is shown adjacent to the second camera 121b. When an image of a subject is captured with the camera 121b, the flash 124 may illuminate the subject.

As shown in FIG. 1B, the second audio output module 152b can be located on the terminal body. The second audio output module 152b may implement stereophonic sound functions in conjunction with the first audio output module 152a, and may be also used for implementing a speaker phone mode for call communication.

At least one antenna for wireless communication may be located on the terminal body. The antenna may be installed in the terminal body or formed by the case. For example, an antenna which configures a part of the broadcast receiving module 111 may be retractable into the terminal body. Alternatively, an antenna may be formed using a film attached to an inner surface of the rear cover 103, or a case that includes a conductive material.

A power supply unit 190 for supplying power to the mobile terminal 100 may include a battery 191, which is mounted in the terminal body or detachably coupled to an outside of the terminal body. The battery 191 may receive power via a power source cable connected to the interface unit 160. Also, the battery 191 can be recharged in a wireless manner using a wireless charger. Wireless charging may be implemented by magnetic induction or electromagnetic resonance.

The rear cover 103 is shown coupled to the rear case 102 for shielding the battery 191, to prevent separation of the battery 191, and to protect the battery 191 from an external impact or from foreign material. When the battery 191 is detachable from the terminal body, the rear case 103 may be detachably coupled to the rear case 102.

An accessory for protecting an appearance or assisting or extending the functions of the mobile terminal 100 can also be provided on the mobile terminal 100. As one example of an accessory, a cover or pouch for covering or accommodating at least one surface of the mobile terminal 100 may be provided. The cover or pouch may cooperate with the display unit 151 to extend the function of the mobile terminal 100. Another example of the accessory is a touch pen for assisting or extending a touch input to a touch screen.

The display unit 151 is a type of display that is deformable by an external force. This deformation, which includes display unit 151 and other components of the mobile terminal 100, may include any of curving, bending, folding, twisting, rolling, and combinations thereof. The deformable display unit 151 may also be referred to as a "flexible display unit." In some implementations, the flexible display unit 151 may include a general flexible display, electronic paper (also known as e-paper), and combinations thereof. In general, the mobile terminal 100 may be configured to include features that are the same or similar to that of mobile terminal 100 of FIGS. 1A-1C.

The flexible display unit of mobile terminal 100 is generally formed as a lightweight, non-fragile display, which still exhibits characteristics of a conventional flat panel display, but is instead fabricated on a flexible substrate which can be deformed as noted previously.

The term e-paper may be used to refer to a display technology employing the characteristic of a general ink, and is different from the conventional flat panel display in view of using reflected light. E-paper is generally understood as changing displayed information using a twist ball or via electrophoresis using a capsule.

When in a state that the flexible display unit 151 is not deformed (for example, in a state with an infinite radius of curvature and referred to as a first state), a display region of the flexible display unit 151 includes a generally flat surface. When in a state that the flexible display unit 151 is deformed from the first state by an external force (for example, a state with a finite radius of curvature and referred to as a second state), the display region may become a curved surface or a bent surface. As illustrated, information displayed in the second state may be visual information output on the curved surface. The visual information may be realized in such a manner that a light emission of each unit pixel (sub-pixel) arranged in a matrix configuration is controlled independently. The unit pixel denotes an elementary unit for representing one color.

According to one alternative embodiment, the first state of the flexible display unit 151 may be a curved state (for example, a state of being curved from up to down or from right to left), instead of being in flat state. In this embodiment, when an external force is applied to the flexible display unit 151, the flexible display unit 151 may transition to the second state such that the flexible display unit is deformed into the flat state (or a less curved state) or into a more curved state.

If desired, the flexible display unit 151 may implement a flexible touch screen using a touch sensor in combination with the display. When a touch is received at the flexible touch screen, the controller 180 can execute certain control corresponding to the touch input. In general, the flexible touch screen is configured to sense touch and other input while in both the first and second states.

One option is to configure the mobile terminal 200 to include a deformation sensor which senses the deforming of the flexible display unit 151. The deformation sensor may be included in the sensing unit 140 (refer to FIG. 1A).

The deformation sensor may be located in the flexible display unit 151 or the case 101 to sense information related to the deforming of the flexible display unit 151. Examples of such information related to the deforming of the flexible display unit 151 may be a deformed direction, a deformed degree, a deformed position, a deformed amount of time, an acceleration that the deformed flexible display unit 151 is restored, and the like. Other possibilities include most any type of information which can be sensed in response to the curving of the flexible display unit or sensed while the flexible display unit 151 is transitioning into, or existing in, the first and second states.

In some embodiments, the controller 180 or other component can change information displayed on the flexible display unit 151, or generate a control signal for controlling a function of the mobile terminal 100, based on the information related to the deforming of the flexible display unit 151. Such information is typically sensed by the deformation sensor.

The mobile terminal 100 is shown having a case 101 for accommodating the flexible display unit 151. The case 101 can be deformable together with the flexible display unit 151, taking into account the characteristics of the flexible display unit 151.

A battery (not shown in this figure) located in the mobile terminal 100 may also be deformable in cooperation with the flexible display unit 151, taking into account the characteristic of the flexible display unit 151. One technique to implement such a battery is to use a stack and folding method of stacking battery cells.

The deformation of the flexible display unit 151 not limited to perform by an external force. For example, the flexible display unit 151 can be deformed into the second state from the first state by a user command, application command, or the like.

In the mobile terminal according to the present invention, a rollable display is accommodated in a rolled state. A user may expose or accommodate the rollable display by applying an external force to the mobile terminal.

Figure 1D:
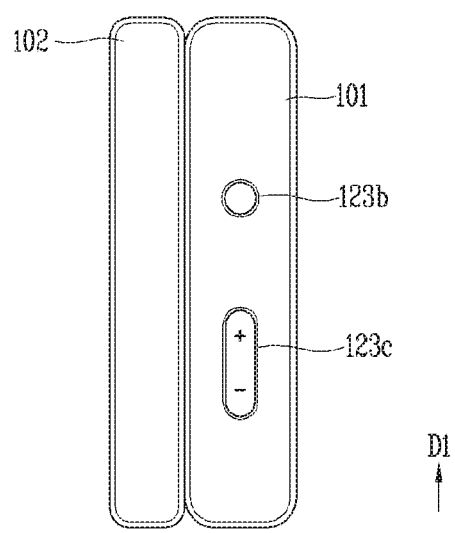

FIGS. 1B to 1D are conceptual views illustrating an example of a rollable mobile terminal according to an embodiment of the present invention.

FIG. 1B is a frontal view of a rollable mobile terminal in a closed state where a first touch screen 151a is accommodated in a terminal body, and FIG. 10 is a frontal view of the rollable mobile terminal in an open state where the first touch screen 151a is exposed from the terminal body. FIG. 1D is a rear view of the rollable mobile terminal in the closed state.

Referring to FIGS. 1B and 10, the mobile terminal 100 of the present invention may include first and second body parts 101, 102, first and second touch screens 151a, 151b, and a first user input unit 123a.

The first and second body parts 101, 102 are extended in a first direction (D1), and are spaced from each other by a tensile force applied to a direction crossing the first direction (D1).

One surface of the first body part 101 and one surface of the second body part 102 may contact each other in a closed state. The first and second body parts 101, 102 may be extended in the first direction (D1) such that lengths thereof may be substantially the same. For instance, a shape of one surface of the first body part 101 may correspond to a shape of one surface of the second body part 102.

As shown in FIG. 1B, in the closed state, the first touch screen 151a may not be exposed to the outside by being accommodated in at least one of the first and second body parts 101, 102. This is in order to prevent damage of the first touch screen 151a by an external environment.

Further, a user may control a size of the mobile terminal according to a usage environment, using a rollable characteristic. The user may reduce the size of the mobile terminal by accommodating the first touch screen 151a in at least one of the first and second body parts 101, 102, for enhanced portability, or may expose the first touch screen 151a to the outside such that a display region of a large screen may be used.

Hereinafter, for convenience, will be explained an embodiment where the first touch screen 151a is not exposed to the outside by being accommodated in at least one of the first and second body parts 101, 102, in the closed state. However, the present invention is not limited to this. For instance, a predetermined region of the first touch screen 151a may be exposed to the outside without being accommodated in at least one of the first and second body parts 101, 102, in the closed state. In this case, even in the closed state, a user may check information related to an event which has occurred from the mobile terminal, through the predetermined region.

The first body part 101 and/or the second body part 102 of the mobile terminal 100 includes a guide unit for guiding the first touch screen 151a to be accommodated in a rollable manner. If the guide unit is provided at the first body part 101, the guide unit is extended in the first direction (D1). And the guide unit includes an accommodation space for accommodating a stylus pen (not shown) therein.

The mobile terminal 100 may further include a stylus pen accommodated in the first body part 101. The stylus pen may be extended in the first direction (D1), and may be accommodated in the first body part 101 in the first direction (D1). The stylus pen is formed to be separable from the first body part 101 by a user's external force.

An end part of the stylus pen may be exposed to the outside of the first body part 101, in an accommodated state into the guide unit. A user may separate the stylus pen from the first body part 101, by applying a force to the stylus pen exposed to the outside of the first body part 101.

One end of the first touch screen 151a is fixed to the first body part 101 so as to be rollable, by the guide unit. And another end of the first touch screen 151a is fixed to the second body part 102. If a distance between the first and second body parts 101, 102 becomes short, the first touch screen 151 is rolled by the guide unit to thus be gradually accommodated in the first body part 101.

The first and second body parts 101, 102 become spaced from each other, by a tensile force applied to a direction crossing the first direction (D1). And the first touch screen 151a is exposed to a space between the first and second body parts 101, 102. As a distance between the first and second body parts 101, 102 becomes longer by the external force, an exposed area of the first touch screen 151a becomes larger.

The first body part 101 may include a transmissive part (not shown) formed of a transmissive material such that part of the first touch screen 151a is transmissive. A user may view an image output from one region of the first touch screen 151a accommodated in the first body part 101, through the transmissive part.

The first touch screen 151a may be integrally formed with a touch sensor for receiving a user's touch input. With such a configuration, the touch sensor included in the first touch screen 151a may sense a touch input applied through the transmissive part. The transmissive part may include a touch sensor thereon.

For instance, the controller may control current state information of the mobile terminal 100 (a current time, a current position, a current date, etc.), information on a received event, etc., to be output to one region of the first touch screen 151a corresponding to the transmissive part, in the closed state. The remaining region except for the one region of the first touch screen 151a corresponding to the transmissive part may maintain an 'OFF' state in the closed state. This may prevent waste of power.

In a case where the transmissive part is provided, a user may view at least one region of the first touch screen 151*a* through the transmissive part. As shown in FIG. 1B, a second touch screen 151*b* rather than the transmissive part may be formed at the first body part 101.

The second touch screen 151*b* may include at least one of state information of the mobile terminal 100, and an icon of a preset application. The state information of the mobile terminal 100 may be at least one of antenna information of the mobile terminal 100, communication mode information, battery information, information on an occurred event, information on a preset function, time information and weather information. The preset application may include at least one of an icon and a widget corresponding to a specific application preset by a user or the controller 180.

The second touch screen 151*b* may include at least one of a liquid crystal display (LCD), a thin film transistor-liquid crystal display (TFT-LCD), an organic light-emitting diode (OLED), a flexible display, a 3D display, and an e-ink display.

The first touch screen 151*a* is accommodated in at least one of the first and second body parts 101, 102 in the closed state, and state information of the mobile terminal 100 may be displayed on the second touch screen 151*b*.

Referring to FIG. 1C, one end of the first touch screen 151*a* is fixed to the first body part 101, and another end of the first touch screen 151*a* is fixed to the second body part 102. With such a configuration, a user may expose the display unit accommodated in the first and second body parts 101, 102 in a rollable manner, to the outside, by pulling the first and second body parts 101, 102 using his or her hands.

Hereinafter, at least one region of the first touch screen 151*a*, exposed to the outside such that a user views visual information, is defined as a 'display region', and a region except for the display region is defined as a 'remaining region'.

The controller 180 may sense at least one of the display region and the remaining region, using the sensing unit 150 (or transformation sensing means). The controller 180 may control screen information to be output to the first touch screen 151*a*, in an 'on' state of the display region and in an 'off' state of the remaining region, based on a sensing result.

The display region displays information processed by the mobile terminal 100, in the open state. For instance, the display region may display thereon execution screen information of an application program being driven on the mobile terminal 100, or User Interface (UI) information and Graphic User Interface (GUI) information based on the execution screen information.

The first and second touch screens 151*a*, 151*b* may include a touch sensor for sensing a touch input applied to the first and second touch screens 151*a*, 151*b* such that a control command may be applied in a touch manner. If a touch input is applied to the touch screens, the touch sensor senses the touch input. And the controller 180 may generate a control command corresponding to the touch input. Content input in a touch manner may be a text or a numerical value, or a menu items indicated or designated in various modes.

The touch sensor may be formed as a film having a touch pattern, and may be disposed between the window 151*a* and a display (not shown) disposed on a rear surface of the window 151*a*. Alternatively, the touch sensor may be a metallic wire directly patterned on the rear surface of the window 151*a*. The touch sensor may be integrally formed with the display. For instance, the touch sensor may be disposed on a substrate of the display, or may be provided in the display.

The display unit shown in FIG. 1A may form a touch screen together with the touch sensor. In this case, the touch screen may serve as the user input unit 123 (refer to FIG. 1A). In some cases, the touch screen may replace at least one function of the user input unit.

A first user input unit 123*a* is disposed at the second body part 102. However, the present invention is not limited to this. That is, the position of the first user input unit 123*a* may be variable.

A control command with respect to the first touch screen 151*a* is received by the first user input unit 123*a*. More specifically, if a push input is applied to the first touch screen 151*a* in the open state, the first touch screen 151*a* is converted into an activated state. That is, the first user input unit 123*a* may be a home button for turning on/off the first touch screen 151*a*.

The first user input unit 123*a* includes a button disposed on a front surface of the second body part and configured to receive a push input, and a fingerprint scanner disposed to overlap the button and configured to recognize a fingerprint of a finger contacting the fingerprint scanner.

The button is exposed to the outside from a front surface of the mobile terminal, and is configured to receive a push input of a first function. The first function may a function to display preset screen information on the display region. For instance, if a user applies a push input to the button while a web page screen is being displayed on the display region, the web page screen on the display region may be converted into a home screen page. As another example, in a case where a plurality of home screen pages have been output to the first touch screen 151*a*, if a push input is applied to the button, the home screen pages may be converted.

The first user input unit 123*a* may be configured to scan a fingerprint of a user who applies a push input thereto. More specifically, a fingerprint scanner module is mounted to one surface of the button (an upper surface in this embodiment), and is configured to recognize a fingerprint of a finger contacting the button. The button is formed to be slidable by a push input, thereby pressing a switch. If the switch is pressed, the controller senses the push input and processes a corresponding control command.

However, the present invention is not limited to such a structure. For instance, the push button may be replaced by a touch button. More specifically, a fingerprint scanner module may be mounted to an upper surface of the touch button. In the following descriptions, a push input through the push button may be replaced by a touch input through the touch button.

The fingerprint scanner module may be used as a functional key related to power on/off. For instance, if the button of the first user input unit 123*a* is pushed in an 'off' state of the mobile terminal, power is supplied to the fingerprint scanner module and a fingerprint recognition process is executed. The mobile terminal determines whether a recognized fingerprint corresponds to a pre-stored fingerprint. If the recognized fingerprint corresponds to the pre-stored fingerprint, the mobile terminal is turned on and booted. A power-on command of the mobile terminal consists of two steps of turning on the fingerprint scanner and turning on the mobile terminal, power consumption may be reduced. That is, a security function through a fingerprint recognition is provided to a power-on operation. However, the fingerprint scanner module may be turned off together with the terminal body, since it is not continuously in an 'on' state.

Further, in this case, the mobile terminal has been turned on by a user. Thus, upon completion of the power-on and the booting-up of the mobile terminal, the display region may immediately enter a home screen page without having a locked screen.

If the recognized fingerprint does not correspond to the pre-stored fingerprint, the power-on and the booting-up of the mobile terminal are stopped. In this case, the mobile terminal may output a warning message indicating that the recognized fingerprint is not the pre-stored fingerprint. The warning message may be implemented as a lighting effect executed on a front surface of the mobile terminal for a predetermined time, or may be implemented as an effect sound.

As another example, if a push input is applied to the first user input unit 123a, in a locked mode where a locked screen has been output to the display region, the locked screen may be converted into a home screen page after being lock-released. In this case, the first user input unit 123a may be a hot key for releasing a locked state.

The release of the locked state is executed only when a fingerprint scanner performs a fingerprint recognition with respect to an object contacting thereto for a push input, and when a recognized fingerprint corresponds to a pre-stored fingerprint. A notification message indicating a fingerprint recognition is being executed may be output to the second touch screen 151b of the mobile terminal.

Referring to FIG. 1D, second and third user input units 123b, 123c may be disposed on a rear surface of the mobile terminal. More specifically, the second and third user input units 123b, 123c may be disposed on a rear surface of the first body part 101.

However, the present invention is not limited to such a configuration. Such a configuration may be omitted or may be changed. For instance, the second user input unit 123b may be provided on a side surface of the first body part 101, not on a rear surface of the first body part 101. And the third user input unit 123c may be provided on a rear surface of the second body part 102, not on a rear surface of the first body part 101.

The mobile terminal may be turned on or off by the second user input unit 123b. For instance, a function related to activation of the second touch screen 151b in an 'on' or 'off' state of the mobile terminal or in the closed state, and a function related to activation of the first and second touch screens 151a, 151b in the open state, may be executed by a push input applied to the second user input unit 123b. That is, the second user input unit 123b may serve as a power key of the mobile terminal.

The third user input unit 123c may serve as a volume key. More specifically, the third user input unit 123c is formed in a lengthwise direction of the first body part 101, and is exposed to a rear surface of the terminal body. The third user input unit 123c is provided with keys disposed at upper and lower regions thereof, and is formed to apply a push input related to control of a sound output from the terminal body.

Although not shown, the components aforementioned with reference to FIG. 1A may be provided at one of a front surface, a side surface, a rear surface and an inner surface of the terminal body. For instance, the first camera may be disposed on a rear surface of the first body part 101, and the second camera may be disposed on a rear surface of the second body part 102.

So far, the structure of the rollable mobile terminal has been explained. A control operation using such a structure may be modified in various manners. Hereinafter, with reference to FIGS. 2A to 9, will be explained a novel type of user interface using characteristics of the rollable display. In a modified embodiment or a preferred embodiment, the same or similar component as or to the aforementioned component will be provided with the same or similar reference numeral, and detailed explanations thereof will be omitted.

Figure 2:
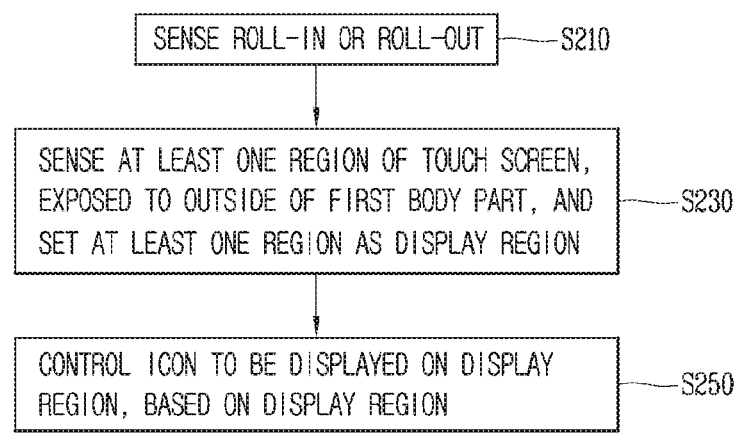
FIG. 2 is a flowchart illustrating a control method of a rollable mobile terminal according to the present invention.

FIG. 2 is a flowchart illustrating a control method of the rollable mobile terminal according to the present invention.

Firstly, the controller 180 (refer to FIG. 1A) senses a roll-in motion or a roll-out motion (S210).

Due to characteristics of the rollable mobile terminal, the first and second body parts 101, 102 may move in a direction to become far from each other or in a direction to become close to each other, by a user's gesture.

For instance, the first and second body parts 101, 102 may be spaced from each other in a locked state, based on a tensile force applied to a direction crossing the first direction (D1). And at least one region of the first touch screen 151a may be exposed to a space between the first and second body parts 101, 102. A state where at least one region of the first touch screen 151a, accommodated in the guide unit, is exposed to the outside of the guide unit is defined as 'roll-out'. The closed state may be converted into the open state by the roll-out.

On the other hand, if the first and second body parts 101, 102 are moved toward directions which become close to each other, at least one region of the first touch screen 151a, exposed to the outside of the guide unit is accommodated in the outside of the guide unit. The state is defined as 'roll-in'. The open state may be converted into the closed state by the roll-in.

Next, the controller 180 senses at least one region of the touch screen 151a (refer to FIG. 1B), exposed to the outside of the first body part 101 (refer to FIG. 1B), and sets the at least one region as a display region (S230).

As the roll-in and the roll-out occur, the display region is changed. The controller 180 may sense a size, a position and a screen ratio of the display region, using the sensing unit 150 (refer to FIG. 1A). The screen ratio of the display region means a ratio between a horizontal length and a vertical length of the display region.

Then, the controller controls one or more icons displayed on the display region, based on the display region (S230).

The icon means a graphic object including a widget, a thumbnail image, etc., and may be a symbolic shape indicating a specific application, a folder, etc. A single icon is matched with a single function. If a touch input is applied to an icon being displayed, the controller 180 executes a function corresponding to the touched icon. For instance, an application set to the icon may be executed, and an execution screen of the application may be output to the touch screen 151a.

The application includes a widget, a home launcher, etc., and means all types of programs operable in the mobile terminal. Thus, the application may be a program to execute a web browser, a video play function, a message transmission/reception function, a schedule management function, and an application update function.

If the application is executed, an execution screen of the application is output to the display region. In this case, a problem may occur because the display region is changed due to a roll-in motion or a roll-out motion. Generally, a manufacturer of an application distributes the application by manufacturing an execution screen with a screen ratio optimized to a display of a mobile terminal. However, a screen ratio of a rollable display is variously changed according to a usage environment or a user's taste. The controller 180 may enlarge or contract an execution screen according to the screen ratio of the display region. In this case, content included in the execution screen may be distorted, or part of the content may not be displayed. An application manufacturer may manufacture an application which supports various screen ratios. However, in this case, the application may have an increased capacity.

In order to solve such a problem, the controller 180 of the rollable mobile terminal controls one or more icons displayed on the display region, based on the display region.

The icon control may be executed in various manners.

For instance, the controller 180 may search for an application optimum for the display region, among a plurality of applications installed at the mobile terminal, and may selectively output an icon of the searched application to the display region.

For instance, when a screen ratio of the display region is 1:1, an icon of an application which supports the screen ratio may be displayed, but an icon of an application which does not support the screen ratio may not be displayed. That is, a different icon may be displayed on the display region according to a screen ratio (or a size) of the display region.

As another example, the controller 180 may display preset icons, and may highlight one or more icons corresponding to the display region among the preset icons.

For instance, when a first application which supports a screen ratio of 1:1 and a second application which supports a screen ratio of 3:4 have been installed, a first icon corresponding to the first application, and a second icon corresponding to the second application may be displayed on the display region. If a screen ratio of the display region is 1:1, the first icon is highlighted. If a screen ratio of the display region is 3:4, the second icon is highlighted. And if a screen ratio of the display region is 9:16, no icon is highlighted since the screen ratio is supported by none of the first and second applications.

The highlight process for informing an application having an execution screen optimum for the current display region, displays an icon corresponding to an application which supports the display region, in a differentiated manner from another icon. For instance, the highlight process is executed by applying a blinking process, an emphasis process, a color change process, etc. to an icon, for a differentiated visual effect from another icon.

An application installed at the mobile terminal may have metadata for guiding a screen ratio supported by the application. The controller 180 may search for metadata of applications installed at the mobile terminal, thereby searching for one or more applications which support the current screen ratio of the display region. For instance, in a case where an application (A) has metadata for supporting a screen ratio of 1:1, if the screen ratio of the display region is 1:1, an icon of the application (A) may be displayed on the display region or may be highlighted.

In case of a rollable mobile terminal, a user may control a display region to be used, according to a usage environment or a personal taste. In this case, since an application optimum for the display region is recommended, the user may use the recommended application, or may re-control the display region.

The mobile terminal may provide information to a user in a novel manner, by controlling an operation of the rollable display.

Hereinafter, an operation of the mobile terminal which executes the control method shown in FIG. 2 will be explained in more detail.

FIGS. 3, 4A, 4B and 5 are conceptual views illustrating an operation of the rollable mobile terminal by the control method of FIG. 2.

Figure 3:
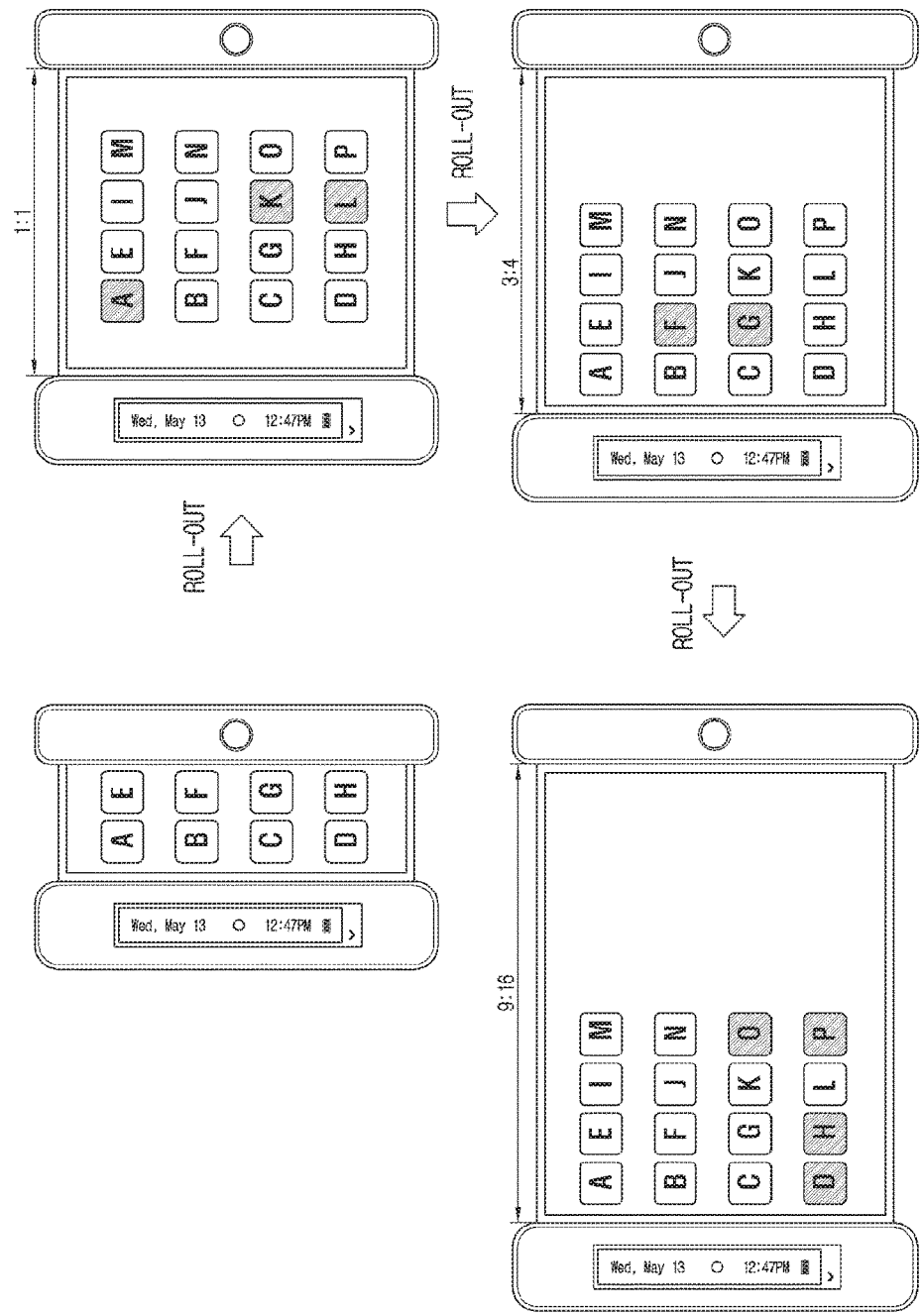
FIGS. 3, 4A, 4B and 5 are conceptual views illustrating an operation of a rollable mobile terminal by the control method of FIG. 2.

Referring to FIG. 3, a home screen page may be output to the display region. For instance, if a closed state where the first and second body parts 101, 102 contact each other is converted into an open state where the display region is exposed to the outside, the controller 180 may control the touch screen such that a home screen page including a plurality of icons may be displayed on the display region.

The home screen page may include at least one object, and the object may be an icon or a widget of an application installed at the mobile terminal.

At least part of the home screen page is displayed on the display region according to an open state of the touch screen 151a. The home screen page is gradually displayed by a roll-out motion, and the home screen page gradually disappears by a roll-in motion.

In this case, a type of an icon displayed on the display region becomes different. In a case where icons included in the home screen page are displayed in an aligned manner in rows and columns, if the display region has a size larger than a first size, icons (A-D) of a first column may be displayed. And if the display region has a size larger than a second size, icons (A-H) of first and second columns may be displayed. That is, a type of a plurality of icons included in the home screen page is variable according to the display region.

The controller 180 may highlight one or more icons corresponding to the display region, among the plurality of icons included in the display region. The one or more icons correspond to one or more applications which support the screen ratio of the display region.

For instance, as shown in a first drawing of FIG. 3, if there is not an application which supports the display region, the icons displayed on the display region are not highlighted. As shown in a second drawing of FIG. 3, if the display region is gradually increased by a roll-out to have a screen ratio of 1:1, and if there are icons (A, K, L) which support the screen ratio, the icons (A, K, L) are highlighted among icons (A-P) included in the display region. As shown in a third drawing of FIG. 3, if the display region is gradually increased by a roll-out to have a screen ratio of 3:4, the highlighted state of the icons (A, K, L) is completed, and icons (F, G) which support the screen ratio of 3:4 are highlighted.

With such a configuration, in case of converting the closed state into the open state, a user may expose at least one region of the touch screen 151a to the outside based on an application to be used.

FIG. 3 illustrates that display positions of the icons are fixed. However, the display positions of the icons may be variable.

Figure 4A:
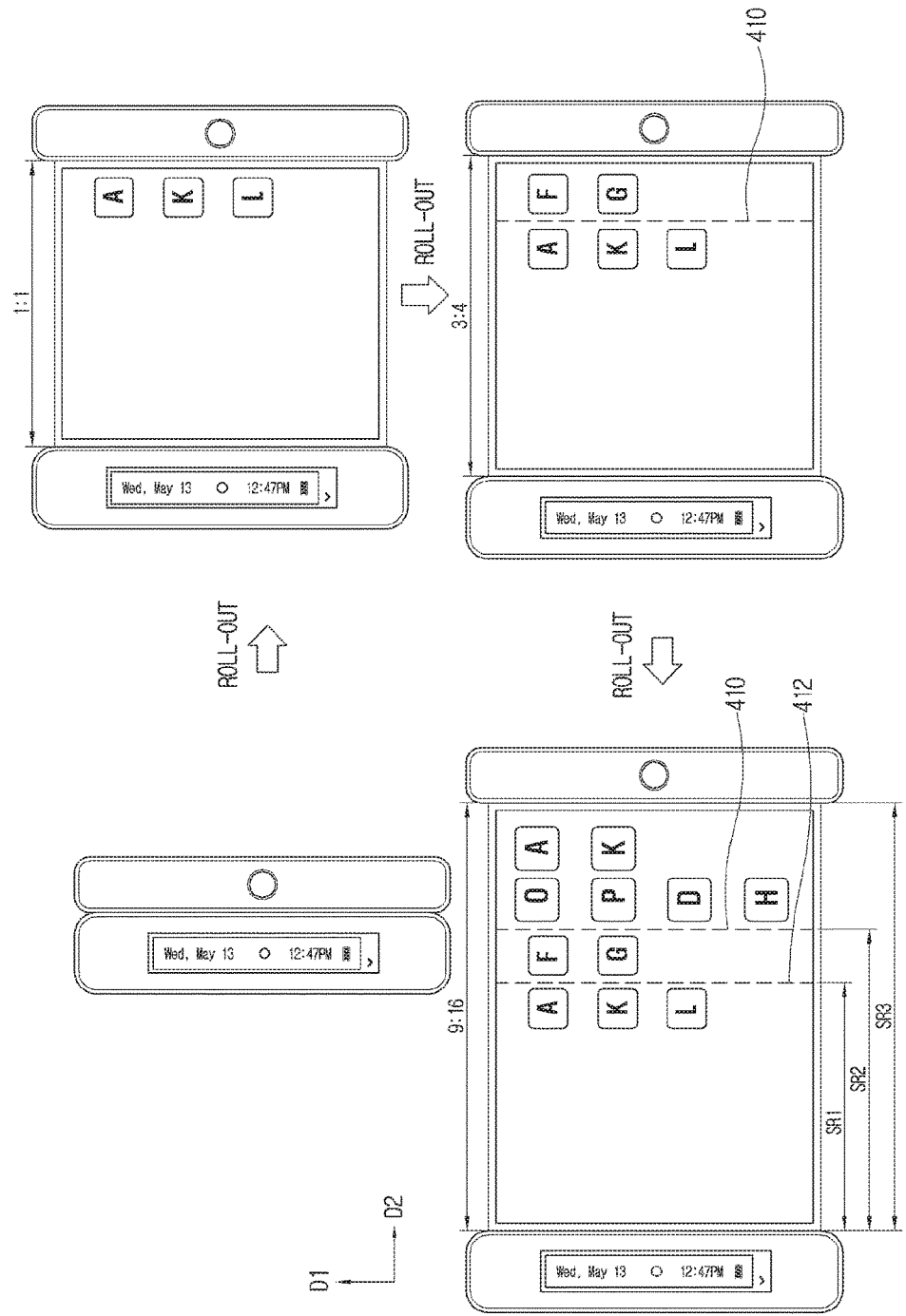

Referring to FIG. 4A, the controller 180 may search for an application which supports a screen ratio of the display region, among a plurality of applications installed at the mobile terminal, and may display an icon of the searched application on the display region.

For instance, as shown in a second drawing of FIG. 4A, if the screen ratio of the display region is 1:1, applications (A,K,L) which support the screen ratio are displayed on the display region.

Further, if the display region is changed to a second region from a first region, the controller 180 re-searches an application which supports a screen ratio of the second region.

Then, the controller 180 displays an icon of the re-searched application on the display region.

For instance, as shown in a third drawing of FIG. 4A, if the screen ratio of the display region is changed to 3:4 from 1:1 by a roll-out motion, icons (D, E) which support the screen ratio of 3:4 are displayed on the display region.

If the second region is larger than the first region, the controller 180 may control the touch screen such that an indicator for guiding at least one of the first and second regions may be output.

The display region is gradually increased by a roll-out motion. Since a vertical length (a direction of 'D1') of the display region is fixed, a horizontal length (a direction of 'D2') of the display region is gradually increased.

As the display region is increased, various types of execution screens may be displayed on the display region.

For instance, as shown in the second drawing of FIG. 4A, if the screen ratio of the display region is 1:1, an execution screen of an application which supports the screen ratio of 1:1 may be output. Thus, icons (A,K,L) of applications which support the screen ratio of 1:1 are displayed on the display region.

As shown in the third drawing of FIG. 4A, if the screen ratio of the display region is increased to 3:4 from 1:1 by a roll-out motion, not only an execution screen of the applications which support the screen ratio of 1:1, but also an execution screen of the applications which support the screen ratio of 3:4 may be output to the display region. Thus, not only the icons (A,K,L) of the applications which support the screen ratio of 1:1, but also the icons (D,E) of the applications which support the screen ratio of 3:4, may be displayed on the display region.

In this case, the controller 180 may output an indicator 410 for guiding at least one of a first region (SR1) corresponding to the screen ratio of 1:1 and a second region (SR2) corresponding to the screen ratio of 3:4, such that the first and second regions (SR1, SR2) may be distinguished from each other. And the controller 180 may display the icons (A,K,L) of the applications which support the screen ratio of the first region (SR1) on a position corresponding to the first region (SR1), and may display the icons (D,E) of the applications which support the screen ratio of the second region (SR2) on a position corresponding to the second region (SR2).

Further, if the display region includes the first region (SR1) corresponding to the screen ratio of 1:1, the second region (SR2) corresponding to the screen ratio of 3:4, and a third region (SR3) corresponding to a screen ratio of 9:16, the controller 180 may display indicators 410, 412 for distinguishing the first to third regions from each other (SR1~SR3).

The first to third regions from each other (SR1~SR3) are merely exemplary, and various screen ratios may be applied to the display region.

The sensing unit 140 may sense a posture of the terminal body. For instance, the rollable mobile terminal 100 may be provided with a gravity sensor, a terrestrial magnetism sensor, an inertia sensor, a gyro sensor, etc., and may sense a posture of the terminal body using the various sensors. The posture of the terminal body, sensed by the sensing unit 140, may include various postures related to a rotation angle of the terminal body, a rotation direction of the terminal body, a rotation speed of the terminal body, a rotation acceleration of the terminal body, etc.

Figure 4B:
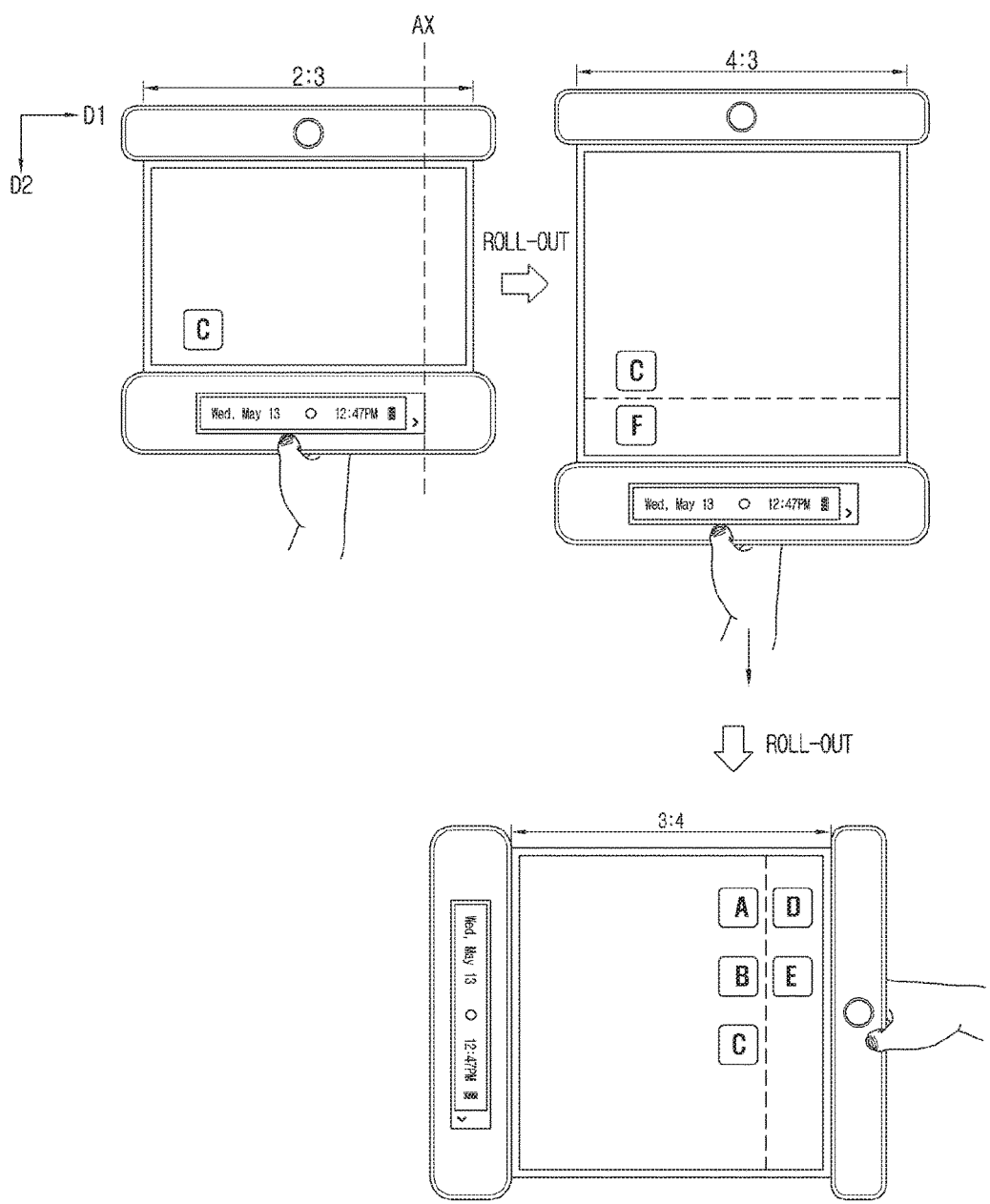
Figure 5:
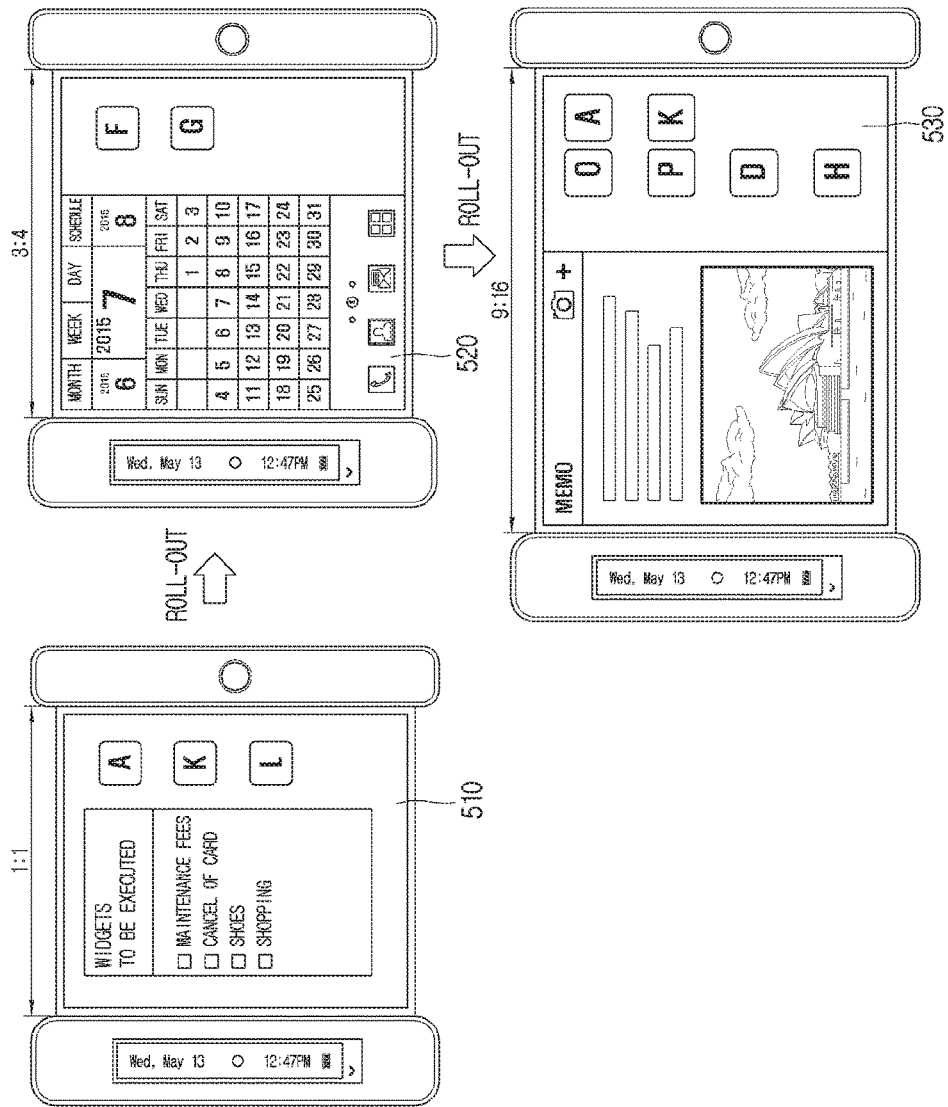

More specifically, as shown in FIG. 4B, the posture of the terminal body may be a relative posture of a first direction of the terminal body (e.g., 'D1') with respect to a virtual reference axis (AX-AX'). The virtual reference axis may be set based on a gravitational direction.

The relative posture of the first direction of the terminal body with respect to the virtual reference axis (AX-AX') may become different according to an angle between the terminal body and the virtual reference axis (AX-AX'). For instance, the relative posture of the first direction of the terminal body with respect to the virtual reference axis (AX-AX') may be a perpendicular posture of the first direction of the terminal body to the virtual reference axis (AX-AX'). A parallel posture of the first direction of the terminal body to the virtual reference axis (AX-AX') may mean that an angle between the terminal body and the virtual reference axis (AX-AX') is 0° or 180°.

The controller 180 may calculate a screen ratio of the display region based on a posture of the terminal body. For instance, when an angle between the first direction of the terminal body and the virtual reference axis (AX-AX') is 0° (refer to FIG. 4A), and when the angle between the first direction of the terminal body and the virtual reference axis (AX-AX') is 90° (refer to FIG. 4B), the screen ratio of the display region may be differently calculated. If the screen ratio is a:b when the angle between the first direction of the terminal body and the virtual reference axis (AX-AX') is 0°, the screen ratio is b:a when the angle between the first direction of the terminal body and the virtual reference axis (AX-AX') is 90°.

If the posture of the terminal body is changed into a second posture from a first posture, the screen ratio of the display region becomes different, and a type of icons displayed on the display region becomes different.

In the rollable mobile terminal according to the present invention, a home screen page may include a plurality of pages corresponding to different screen ratios. For instance, the home screen page may include a first page set to be displayed on the display region when the screen ratio of the display region satisfies a first condition, and a second page set to be displayed on the display region when the screen ratio of the display region satisfies a second condition.

In this case, the controller 180 controls the touch screen 151a such that a page corresponding to a size of the display region, among the plurality of pages included in the home screen page, may be displayed on the display region. For instance, as shown in a first drawing of FIG. 5, if the screen ratio of the display region is 1:1, a first page 510 corresponding to the screen ratio may be output. As shown in a second drawing of FIG. 5, if the screen ratio of the display region is 3:4, a first page 520 corresponding to the screen ratio may be output.

Since one of a plurality of pages including different graphic objects is selectively output to the display region, a user may check the various pages simply and rapidly, by a roll-in motion or a roll-output motion. In conclusion, in the rollable mobile terminal according to the present invention, as the display region is changed, a page set to be displayed on a corresponding screen size is output to the display region.

Figure 6A:
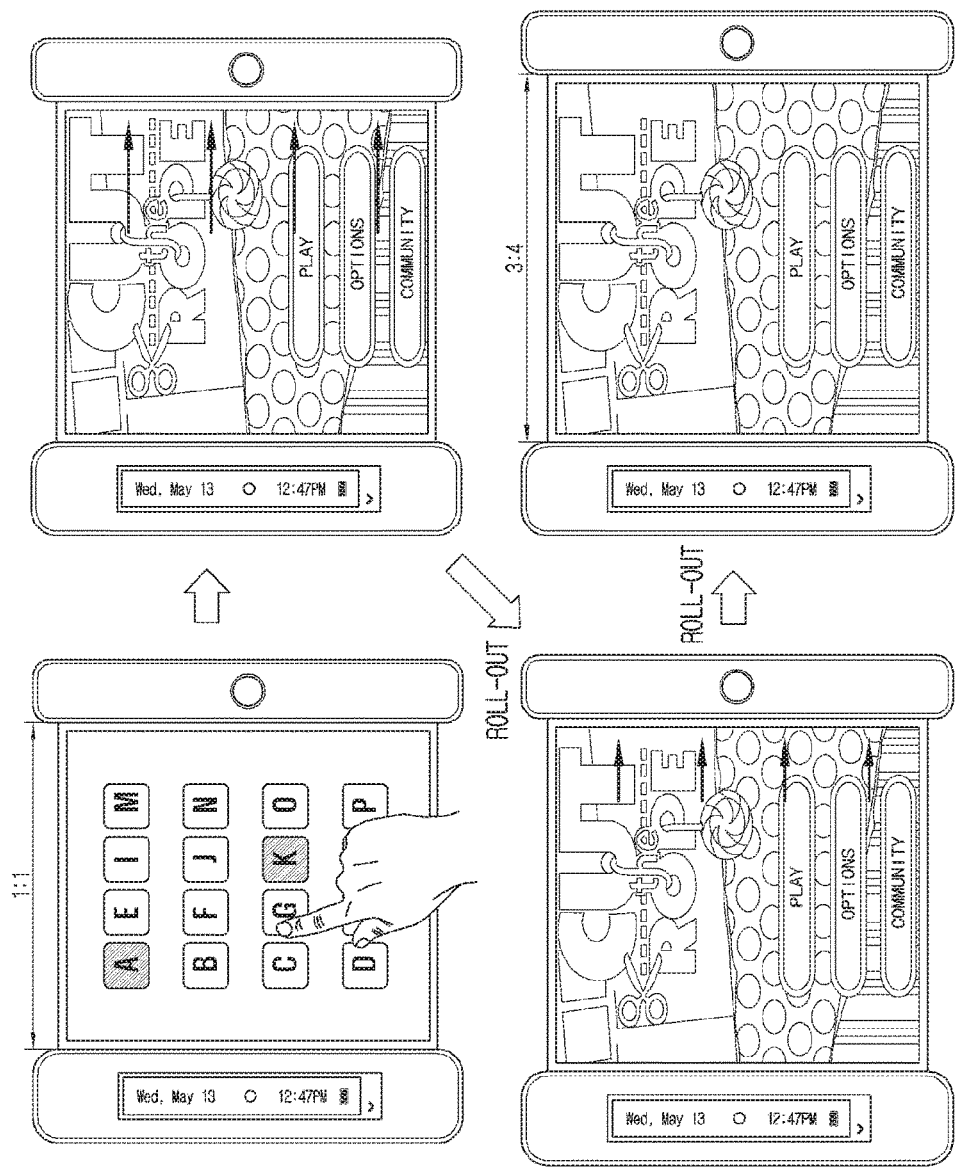

FIGS. 6A and 6B are conceptual views illustrating an operation of the rollable mobile terminal when an execution screen is displayed on the display region.

If a touch input is applied to one of a plurality of icons displayed on the display region, the controller 180 executes an application corresponding to the one icon, and controls the touch screen such that an execution screen is displayed on the display region.

For instance, referring to FIG. 6A, if a touch input is applied to an icon (G), an application corresponding to the icon (G) may be executed, and an execution screen may be output to the display region.

In a case where a horizontal length of the display region is shorter than a horizontal length of the execution screen, part of the execution screen may not be displayed on the display region. In this case, the controller 180 controls the touch screen 151a such that guidance information 610 indicating a non-displayed state of part of the execution screen is displayed on the display region.

The guidance information 610, a bar-type image long-formed along on a side surface of the mobile terminal, may be displayed close to at least one of the first and second body parts 101, 102. However, the guidance information output to the display region is merely exemplary. That is, various types of guidance information indicating a non-displayed state of part of the execution screen, may be output to the display region.

As a size of the display region is changed by a roll-in motion or a roll-out motion, the guidance information 610 may be gradually enlarged or contracted to a left region or a right region. For instance, if a region not displayed on the display region is increased by a roll-in motion, the guidance information 610 may be enlarged. On the other hand, if a region not displayed on the display region is decreased by a roll-out motion, the guidance information 610 may be contracted.

If the horizontal length of the display region becomes equal to the horizontal length of the execution screen, the guidance information 610 disappears.

A user may perform a roll-in motion or a roll-out motion based on the guidance information 610, such that the horizontal length of the display region may become equal to the horizontal length of the execution screen.

In a case where the horizontal length of the display region is longer than the horizontal length of the execution screen, the execution screen may not be displayed on part of the display region.

For instance, in a case where the screen ratio of the display region is 9:16, if a touch input is applied to an icon (K) to which a screen ratio of 1:1 has been set, an execution screen corresponding to the icon (K) may be output.

In this case, the display region is divided into a region where the execution screen is output, and a region where the execution screen is not output. The controller 180 outputs an icon of another application, to the region where the execution screen is not output.

A type of the another application may become different according to an application of the execution screen.

For instance, applications installed at the mobile terminal may be sorted to have different categories. That is, applications installed at the mobile terminal may be grouped by preset categories such as games, finance and education. If an execution screen of a first application included in a first category is output, icons of another applications included in the first category may be displayed on a region where the execution screen is not displayed.

If a touch input is applied to the icon of the another application, the controller 180 controls the touch screen such that an execution application of the another application is displayed on the region where the execution screen is not output while the execution screen is continuously displayed. That is, an execution screen of a first application, and an execution screen of a second application may be output to different parts of the display region. In this case, a mark 'X' is generated, and the specific execution screen disappears when a user touches the mark 'X'.

With such a configuration, if the display region is larger than an execution screen of a specific application, an icon of another application included in the same category is displayed on the region where the execution screen is not output. This may allow the display region to be utilized effectively.

Figure 7A:
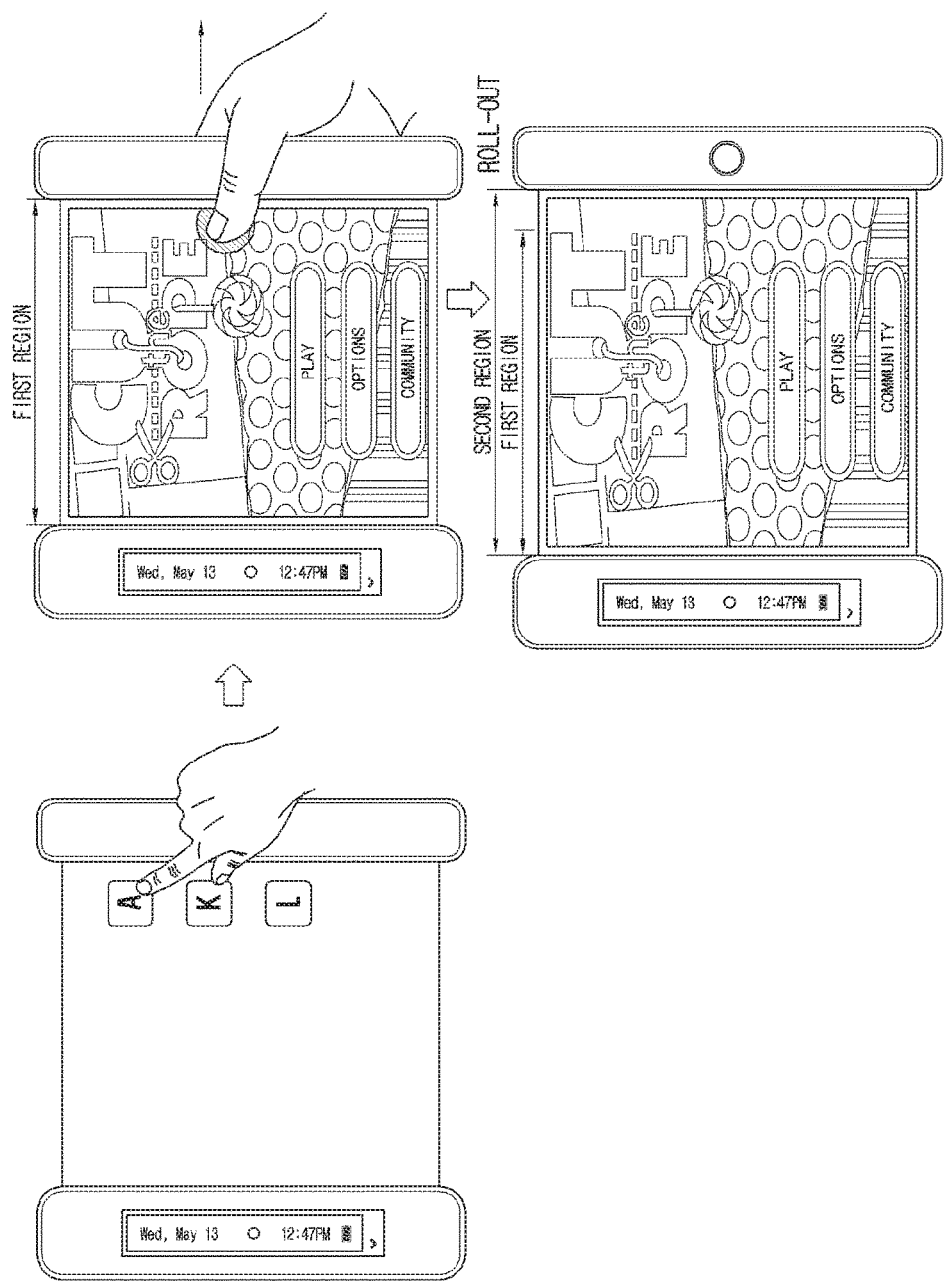
FIGS. 7A to 7C are conceptual views illustrating an operation of a rollable mobile terminal when a roll-in motion and a roll-out motion occur while an execution screen is being displayed.
Figure 7B:
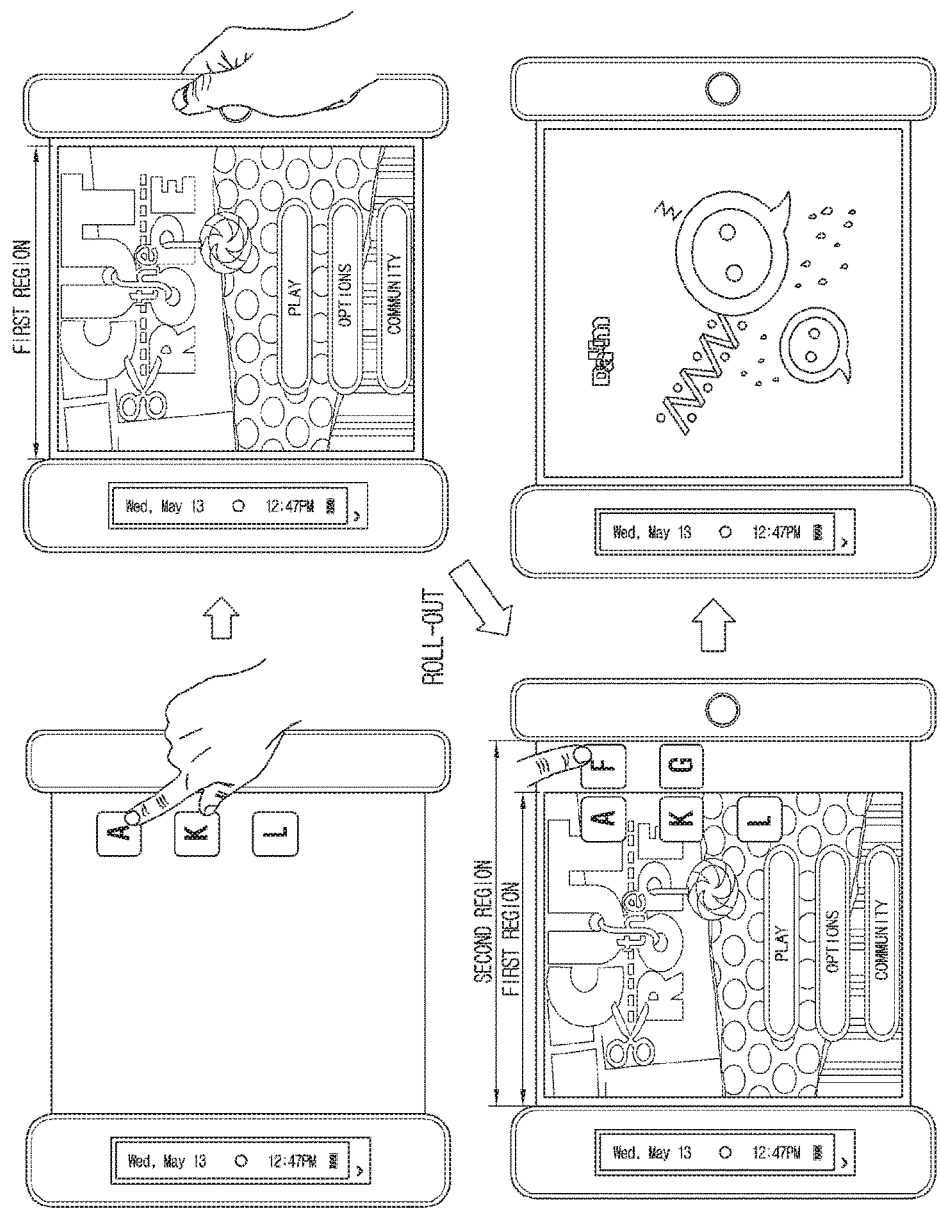
Figure 7C:
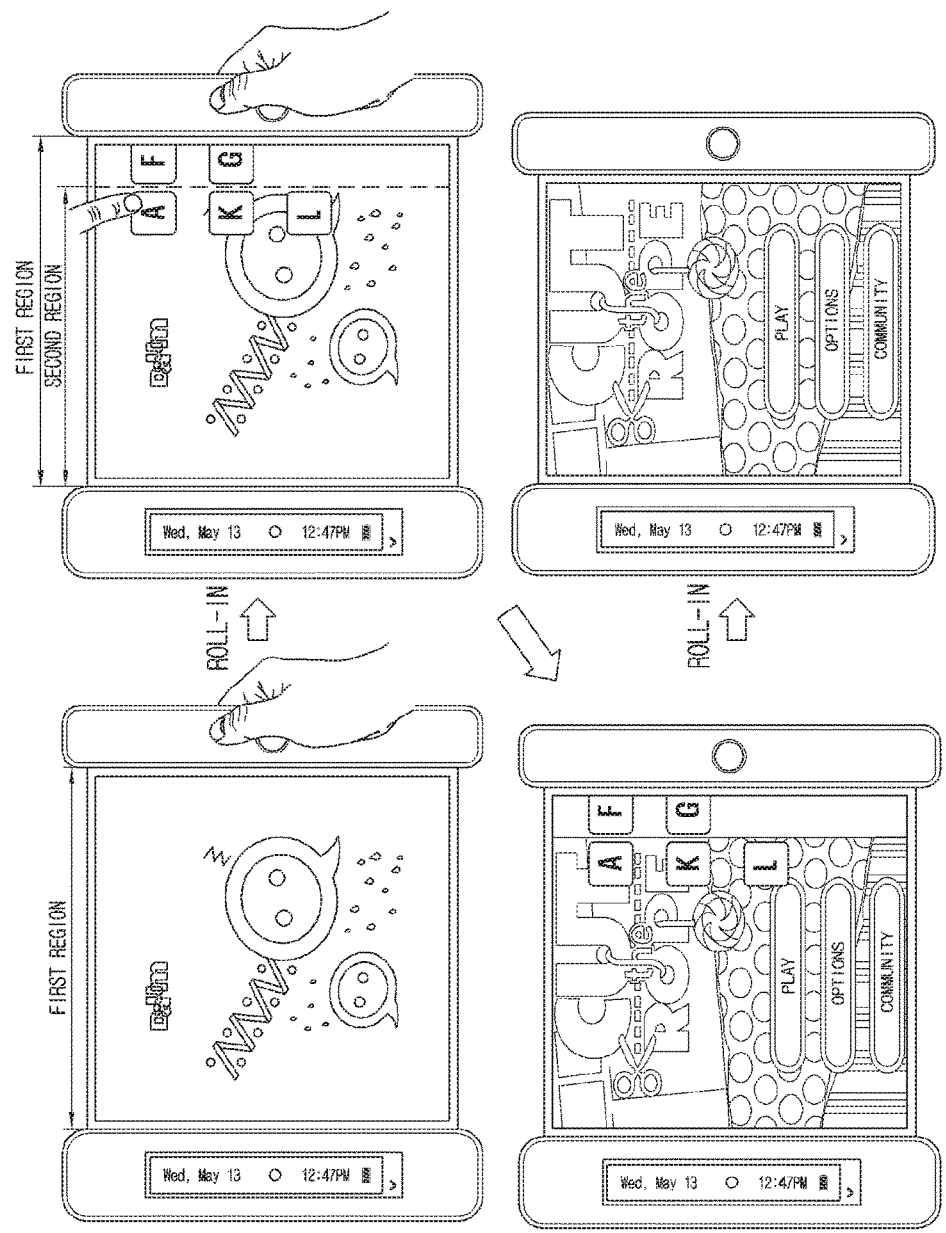

FIGS. 7A to 7C are conceptual views illustrating an operation of the rollable mobile terminal when a roll-in motion and a roll-out motion occur while an execution screen is being displayed.

If a touch input is applied to one of a plurality of icons displayed on the display region, the controller 180 executes an application corresponding to the one icon, and controls the touch screen 151a such that an execution screen is displayed on the display region.

If the display region is changed into a second region from a first region while the execution screen is being displayed, a display position of the execution screen is controlled according to whether a preset touch input has been applied or not.

More specifically, if the display region is changed into the second region from the first region while a preset touch input is being input, the controller 180 enlarges or contracts the execution screen such that the execution screen is displayed on the second region.

The preset touch input may be a long touch for long-touching one spot on the display region for a predetermined time. The long touch is merely exemplary, and the preset touch input may be various types of inputs in embodiments.

For instance, as shown in FIG. 7A, if a roll-out motion is performed while a preset touch input is being applied to the display region, the execution screen may be displayed in a gradually-enlarged manner as the display region is gradually enlarged by the roll-out motion. Although not shown, if a roll-in motion is performed while a preset touch input is being applied to the display region, the execution screen is displayed in a gradually-contracted manner.

If the preset touch input has not been input while the display region is changed into the second region from the first region, the controller 180 controls the touch screen 151a such that at least part of the execution screen is displayed on at least part of the first region.

For instance, as shown in FIG. 7B, if the first region is enlarged to the second region, the execution screen is entirely displayed on the first region.

As another example, as shown in FIG. 7C, if the first region is enlarged to the second region, part of the execution screen is not displayed, because part of the touch screen 151a is accommodated in the mobile terminal by an amount obtained by deducting the second region from the first region. That is, the execution screen, which has been displayed on the first region, is partially displayed on part of the first region.

The controller 180 may search for applications which support a screen ratio of the second region, and may display icons of the searched applications on the display region. Since the screen ratio of the second region includes a screen ratio of 1:1 and a screen ratio of 3:4, icons (A, K, L) of a first group corresponding to the screen ratio of 1:1, and icons (F, G) of a second group corresponding to the screen ratio of 3:4 may be displayed.

If the execution screen is displayed in an overlapped manner with the icons of the searched applications, the controller 180 displays the icons of the searched applications, on an empty space of the execution screen where a graphic object has not been displayed. The graphic object is formed to execute a preset function by a touch input, which may be an icon or a menu. The reason is as follows. If icons corresponding to different functions are displayed in an overlapped manner, the mobile terminal may malfunction.

If a touch input is applied to one (F) of the icons (A, K, L, F, G) of the searched applications, an execution screen of the touched icon (F) is displayed on the display region.

Since the execution screen is displayed in an overlapped manner with the icons (A, K, L, F, G) of the searched applications, a user needs not return to the home screen page when converting the execution screen into an execution screen of another application. That is, the user may be provided with a list of other applications displayable on the display region, by performing a roll-in motion or a roll-out motion while the execution screen is being output.

Figure 8:
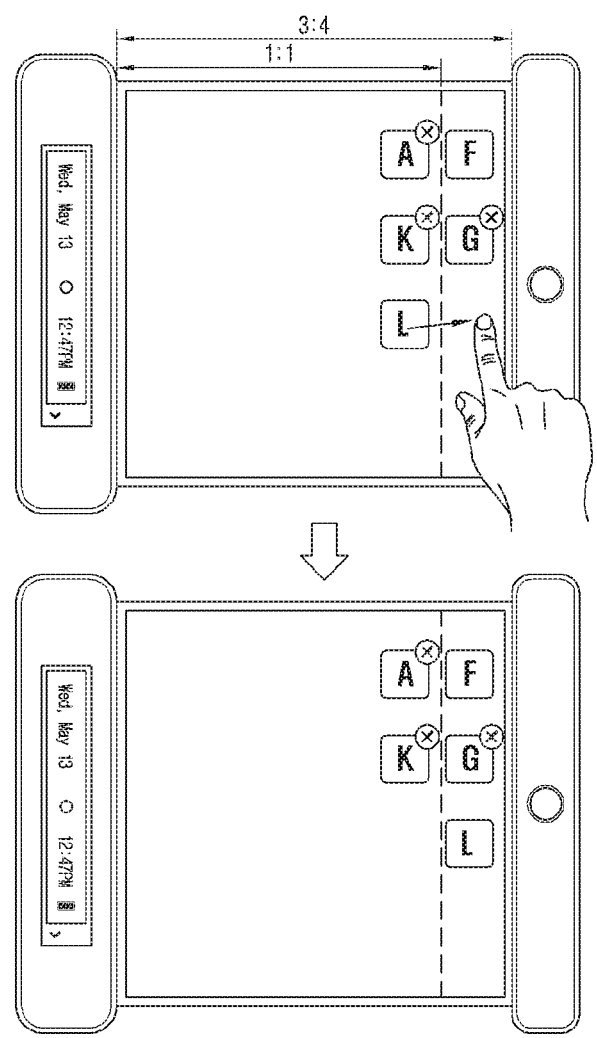
FIG. 8 is a view illustrating a method of changing a display position of an icon based on a user's input.

FIG. 8 is a view illustrating a method of changing a display position of an icon based on a user's input.

An application may support one or more screen ratios. For instance, if an application has a first mode for supporting a screen ratio of 1:1 and a second mode for supporting a screen ratio of 3:4, the controller 180 may selectively execute one of the first and second modes according to a screen ratio of the display region.

The controller 180 may change a preset screen ratio of an execution screen into another screen ratio by a user's input, or may set an execution screen to be output with only one screen ratio among a plurality of screen ratios.

For instance, as shown in FIG. 8, the controller 180 may change a preset screen ratio (1:1) of an application (L) into a screen ratio (3:4). In this case, if the display region has the screen ratio of 3:4, an icon (L) is displayed on the display region.

Figure 9:
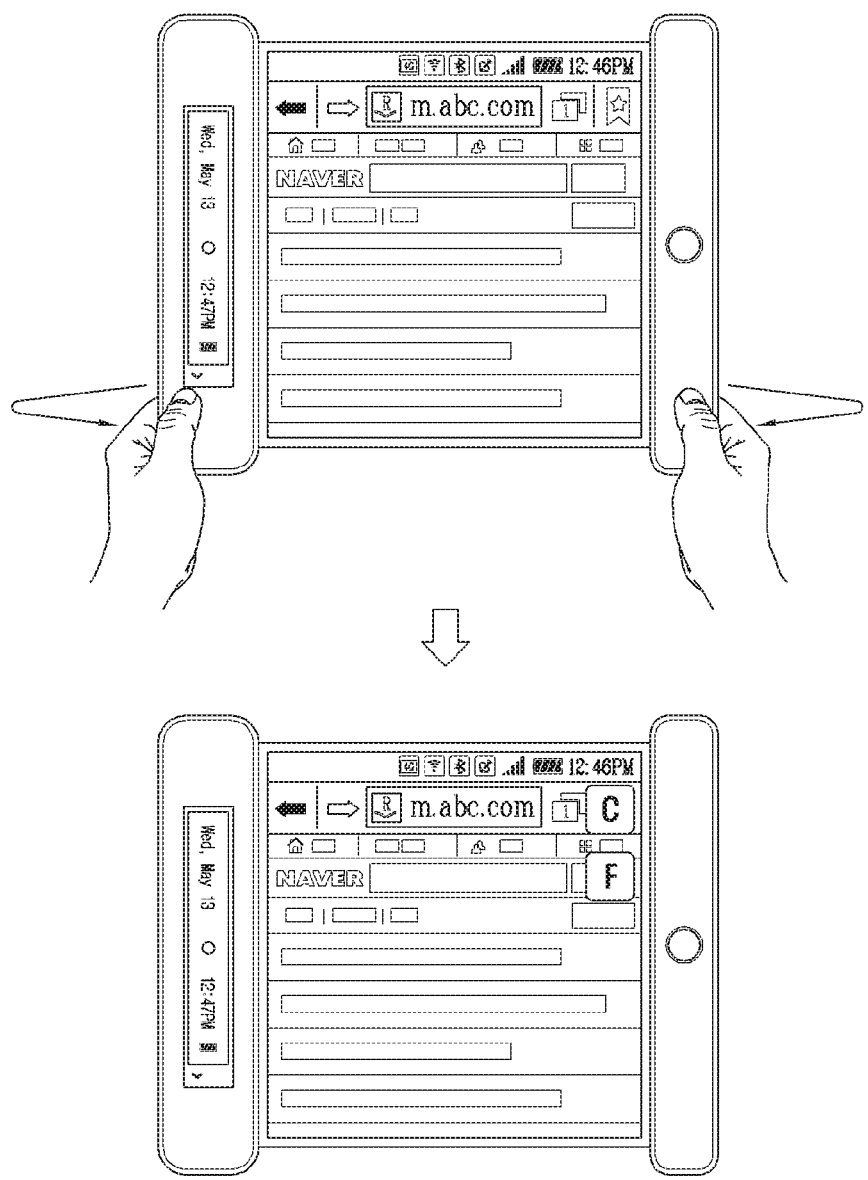
FIG. 9 is a view illustrating a method of displaying icons suitable to be output to a display region.

FIG. 9 is a view illustrating a method of displaying icons suitable to be output to the display region.

A list of applications suitable to be output to the display region may be provided by a preset user's gesture. More specifically, if a preset user's gesture is applied while screen information is being displayed on the display region, the controller may search for an application which supports a screen ratio of the display region, and may output an icon of the searched application to the screen information.

The preset user's gesture may be a gesture to move the first and second body parts 101, 102 toward directions which become far from each other, and then to return to the original state. Alternatively, the preset user's gesture may be a gesture to move the first and second body parts 101, 102 toward directions which become close to each other, and then to return to the original state.

A user may be provided with a list of applications for displaying an execution screen on the display region, without changing the display region.

Various embodiments may be implemented using a machine-readable medium having instructions stored thereon for execution by a processor to perform various methods presented herein. Examples of possible machine-readable mediums include HDD (Hard Disk Drive), SSD (Solid State Disk), SDD (Silicon Disk Drive), ROM, RAM, CD-ROM, a magnetic tape, a floppy disk, an optical data storage device, the other types of storage mediums presented herein, and combinations thereof. If desired, the machine-readable medium may be realized in the form of a carrier wave (for example, a transmission over the Internet). The processor may include the controller 180 of the mobile terminal.

As the present features may be embodied in several forms without departing from the characteristics thereof, it should also be understood that the above-described embodiments are not limited by any of the details of the foregoing description, unless otherwise specified, but rather should be construed broadly within its scope as defined in the appended claims, and therefore all changes and modifications that fall within the metes and bounds of the claims, or equivalents of such metes and bounds are therefore intended to be embraced by the appended claims.

What is claimed is:

1. A mobile terminal, comprising:
a touch screen configured to be rollable;
a first body portion connected to a first end of the touch screen and configured to accommodate the touch screen in a rolled state;
a second body portion connected to a second end of the touch screen;
a sensing unit configured to sense at least one region of the touch screen exposed external to the first body portion; and
a controller configured to:
cause the touch screen to display a home screen page comprising a plurality of icons on a display region when the mobile terminal is changed from a closed state where the touch screen is rolled in the first body portion to an open state where the display region is exposed, the display region corresponding to the sensed at least one region;
search for one or more applications which support a screen ratio of the display region among a plurality of applications installed at the mobile terminal;
highlight one or more icons of the plurality of icons corresponding to the searched one or more applications,
cause the touch screen to display a first icon of a first application supporting a first screen ratio in a first area of the display region and display a second icon of a second application supporting a second screen ratio in a second area of the display region,
cause the touch screen to display the first icon in the second area in response to a touch input dragging the first icon from the first area to the second area; and
change a preset screen ratio of the first application from the first screen ratio to the second screen ratio in response to the touch input.

2. The mobile terminal of claim 1,
wherein the first application is one of the plurality of applications installed at the mobile terminal.

3. The mobile terminal of claim 1, wherein the displayed plurality of icons are changed according to a change to the display region.

4. The mobile terminal of claim 1, wherein:
the home screen page comprises a plurality of pages, and
the controller is further configured to cause the touch screen to display one page of the plurality of pages that corresponds to a size of the display region.

5. The mobile terminal of claim 1, wherein the first area has a first size and the second area has a second size.

6. The mobile terminal of claim 2, wherein the controller is further configured to:
execute the first application in response to a touch input to the displayed first icon; and
cause the touch screen to display an execution screen of the first application.

7. The mobile terminal of claim 6, wherein the controller is further configured to cause the touch screen to display guidance information indicating that a portion of the execution screen is not displayed when the displayed execution screen is larger than the display region.

8. The mobile terminal of claim 6, wherein the controller is further configured to control a display position of the displayed execution screen according to whether a preset touch is input when the display region is changed from a first region having a first size to a second region having a second size while the execution screen is being displayed.

9. The mobile terminal of claim 8, wherein the controller is further configured to:
  enlarge or reduce a size of the displayed execution screen if the display region is changed to the second region while the preset touch is input; and
  cause the touch screen to display at least part of the execution screen on at least part of the second region if the preset touch has not been input while the display region is changed to the second region.

10. A method of controlling a mobile terminal comprising a rollable touch screen, the method comprising:
  displaying a home screen page comprising a plurality of icons on a display region of the touch screen, wherein the display region corresponds to at least one region of the touch screen which is exposed external to a terminal body of the mobile terminal;
  adjusting the display region according to a change of the display region resulting from a roll-in or a roll-out of the touch screen, wherein the display region is changed to a first region having a first size or a second region having a second size;
  searching for one or more applications which support a screen ratio of the display region among a plurality of applications installed at the mobile terminal;
  highlighting one or more icons of the plurality of icons corresponding to the searched one or more applications;
  displaying a first icon of a first application supporting a first screen ratio in a first area of the display region and displaying a second icon of a second application supporting a second screen ratio in a second area of the display region;
  displaying the first icon in the second area in response to a touch input dragging the first icon from the first area to the second area; and
  changing a preset screen ratio of the first application from the first screen ratio to the second screen ratio in response to the touch input.

11. The method of claim 10,
  wherein the first application is one of the plurality of applications installed at the mobile terminal.

12. The method of claim 11, wherein the first area has a first size and the second area has a second size.

* * * * *